(12) United States Patent
Zerial

(10) Patent No.: US 10,500,825 B2
(45) Date of Patent: *Dec. 10, 2019

(54) EXTENSIBLE PAPER LAMINATES AND THEIR USES

(71) Applicant: WOLVERINE AUTOMOTIVE BOARD SALES, INC., Monroe, MI (US)

(72) Inventor: Matthew Edward Zerial, Grand Rapids, MI (US)

(73) Assignee: WOLVERINE AUTOMOTIVE BOARD SALES, INC., Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,475

(22) Filed: Dec. 19, 2018

(65) Prior Publication Data

US 2019/0126603 A1 May 2, 2019

Related U.S. Application Data

(63) Continuation-in-part of application No. 15/496,627, filed on Apr. 25, 2017, now Pat. No. 10,195,832, which is a continuation-in-part of application No. 15/137,703, filed on Apr. 25, 2016, now Pat. No. 10,183,767.

(60) Provisional application No. 62/179,166, filed on Apr. 29, 2015, provisional application No. 62/660,556, filed on Apr. 20, 2018.

(51) Int. Cl.
*B32B 29/00* (2006.01)
*B65D 65/40* (2006.01)
*B32B 7/12* (2006.01)

(52) U.S. Cl.
CPC ............ *B32B 29/005* (2013.01); *B65D 65/40* (2013.01); *B32B 7/12* (2013.01); *B32B 2307/54* (2013.01); *B32B 2307/718* (2013.01); *B32B 2309/105* (2013.01); *B32B 2553/00* (2013.01)

(58) Field of Classification Search
CPC ..... B32B 7/12; B32B 29/005; B32B 2307/54; B32B 2307/718; B32B 2309/105; B32B 2553/00
USPC ......................................................... 428/535
See application file for complete search history.

(56) References Cited

U.S. PATENT DOCUMENTS

| 4,826,714 A | 5/1989 | King |
| 6,454,500 B1 | 9/2002 | Shetty |
| 10,183,767 B2 * | 1/2019 | Zerial ..................... B65B 13/02 |

(Continued)

OTHER PUBLICATIONS

Tolko Industries LTD., Kraft Unbleached SPX®—Vector Product Specifications, Kraft Papers Division, 1 page, Specifications in effect as of Jan. 1, 2015.

(Continued)

*Primary Examiner* — Chinessa T. Golden
(74) *Attorney, Agent, or Firm* — McGarry Bair PC

(57) ABSTRACT

A multi-layered laminated paper structure that has at least two layers of an extensible kraft paper is provided. The extensible kraft paper has a basis weight of 25-400 pounds per 3000 sq. ft. The multi-layered laminated paper structure also has one or more layers of a non-extensible kraft paper and a layer of adhesive which bonds each of the at least two layers of extensible or non-extensible kraft paper together to form a flexible solid multi-layered laminated paper structure.

22 Claims, 28 Drawing Sheets

(56) References Cited

U.S. PATENT DOCUMENTS

| | | |
|---|---|---|
| 10,195,832 B2 * | 2/2019 | Zerial .................. B65D 65/40 |
| 2004/0105600 A1 | 6/2004 | Floyd, Jr. |
| 2008/0284071 A1 | 11/2008 | Knewtson et al. |

OTHER PUBLICATIONS

Tolko Industries LTD., Kraft Unbleached SPX®—Velocity Primer Product Specifications, Kraft Papers Division, 1 page, Specifications in effect as of Jan. 1, 2015.

Tolko Industries LTD., Kraft Paper Product Specifications, Kraft Papers Division, 16 pages, Specifications in effect as of Jan. 1, 2016, [accessed from Internet Apr. 25, 2016, http://tolko.com/resources/standardsspecifications].

* cited by examiner

POSSIBLE COMBINATIONS FOR END PANEL LAMINATIONS

| 3 PLIES OF EXTENSIBLE KRAFT | | | 2 PLIES OF EXTENSIBLE KRAFT<br>1 PLY OF LINERBOARD | | | 1 PLY OF EXTENSIBLE KRAFT<br>2 PLIES OF LINERBOARD | | |
|---|---|---|---|---|---|---|---|---|
| ply 1 | ply 2 | ply 3 | ply 1 | ply 2 | ply 3 | ply 1 | ply 2 | ply 3 |
| 70EK | 100EK | 70EK | 80EK | 26LB | 80EK | 26LB | 80EK | 26LB |
| 65EK | 95EK | 65EK | 75EK | 30LB | 75EK | 30LB | 75EK | 30LB |
| 70EK | 90EK | 70EK | 70EK | 33LB | 70EK | 33LB | 70EK | 33LB |
| 75EK | 85EK | 75EK | 65EK | 38LB | 65EK | 38LB | 65EK | 38LB |
| 80EK | 80EK | 80EK | 60EK | 42LB | 60EK | 42LB | 60EK | 42LB |
| 80EK | 75EK | 80EK | 55EK | 56LB | 55EK | 56LB | 55EK | 56LB |
| 80EK | 70EK | 80EK | 50EK | 69LB | 50EK | 69LB | 50EK | 69LB |
| 80EK | 65EK | 80EK | 80EK | 30HPLB | 80EK | 30HPLB | 80EK | 30HPLB |
| 80EK | 60EK | 80EK | 75EK | 33HPLB | 75EK | 33HPLB | 75EK | 33HPLB |
| 80EK | 55EK | 80EK | 70EK | 33HPLB | 70EK | 33HPLB | 70EK | 33HPLB |
| 80EK | 50EK | 80EK | 65EK | 33HPLB | 65EK | 33HPLB | 65EK | 33HPLB |
| | | | 60EK | 46HPLB | 60EK | 46HPLB | 60EK | 46HPLB |
| | | | 55EK | 52HPLB | 55EK | 52HPLB | 55EK | 52HPLB |
| | | | 50EK | 56HPLB | 50EK | 56HPLB | 50EK | 56HPLB |

EK - EXTENSIBLE KRAFT    (UNITS EXPRESSED IN POUNDS PER 3000 SQ. FT.)
LB - LINERBOARD    (UNITS EXPRESSED IN POUNDS PER 1000 SQ. FT.)
HPLB - HIGH PERFORMANCE LINERBOARD    (UNITS EXPRESSED IN POUNDS PER 1000 SQ. FT.)

NOTE:
The order or position of the plies when laminated is not critical.
The chart does not list all of the possible combinations or mean to limit the invention to those listed there.
There may be four or more plies in combination with extensible kraft, but 3 should be sufficient.

FIG. 15

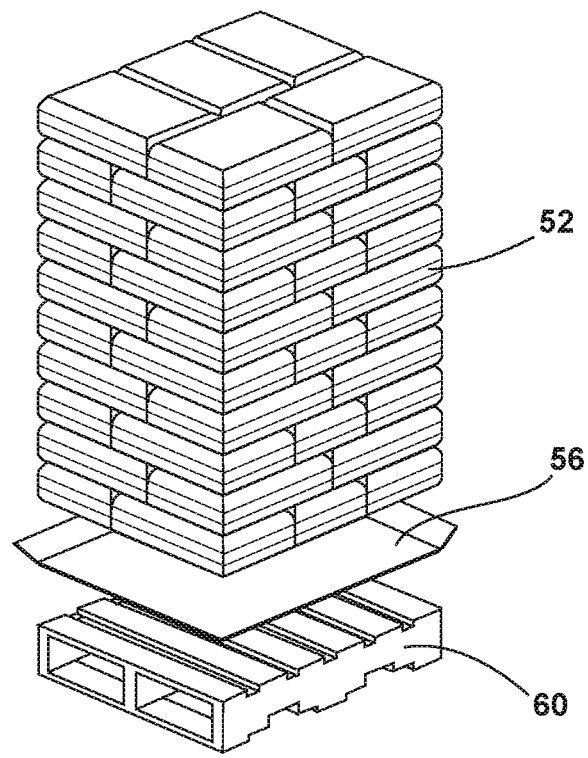
FIG. 19A
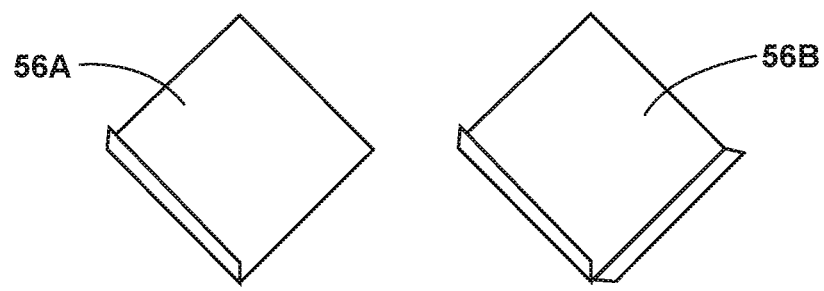
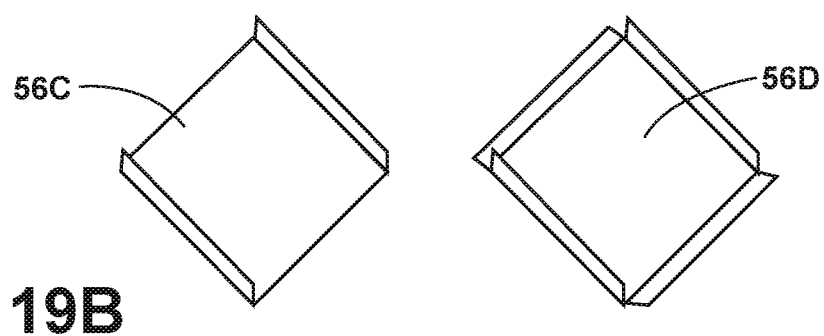
FIG. 19B

EXTENSIBLE PAPER LAMINATES AND THEIR USES

CROSS-REFERENCE TO RELATED APPLICATIONS

This application claims priority under 35 U.S.C. § 119(e) to U.S. Provisional Patent Application No. 62/660,556, entitled "Extensible paper laminates in Automotive seat applications", filed Apr. 20, 2018, which is hereby incorporated by reference in its entirety. This Application is also a continuation-in-part of U.S. patent application Ser. No. 15/496,627, filed Apr. 25, 2017, entitled "Extensible Paper Laminates and their Uses", now U.S. Pat. No. 10,195,832, issued on Feb. 5, 2019 which is herein incorporated by reference in its entirety, and which is a continuation-in-part of U.S. patent application Ser. No. 15/137,703, filed Apr. 25, 2016, entitled "BOX SPRING PACKAGING METHOD AND APPARATUS," which is herein incorporated by reference in its entirety. U.S. patent application Ser. No. 15/137,703 claims priority under 35 U.S.C. § 119(e) to U.S. Provisional Patent Application No. 62/179,166, filed Apr. 29, 2015, entitled "BOX SPRING PACKAGING METHOD AND APPARATUS," which is herein incorporated by reference in its entirety.

FIELD OF THE INVENTION

The present invention relates to multi-layered laminated paper structures comprised of extensible and non-extensible kraft paper laminates and the various applications and uses thereof.

BACKGROUND OF THE INVENTION

To one skilled in the art of solid fiber paper lamination (100% adhesion across the entire surface area of each ply of paper), the desired attributes of a lamination of 2, 3, 4, or even 5 plies of paper are typically rigidity and stiffness. For years, paper laminates have been used to replace wood, e.g., hardboard, Masonite, and plywood, for certain applications, as paper laminates can perform similarly to wood in rigidity and stiffness. Likewise, it is common for the choice of adhesive used to laminate the plies together to include an adhesive that can add stiffness to the finished laminate after drying. Therefore, one skilled in the art believes that regardless of the type of paper being laminated, the resultant multi-layered laminated paper structure would have the characteristics of being rigid and stiff. For example, automotive seat backs often use a stiffener made of wood or solid laminated paper. In one application, however, plastic is traditionally used because of its flexibility while running through an inverter machine process. As a cost savings alternative to plastic, a solid laminated paperboard was trialed in the process. Due to the solid laminated paperboard stiffness and rigidity, normally a positive attribute, the board fractured and failed during the inversion machine process. It could be beneficial to have multi-layered laminated paper structures that are rigid, stiff, and flexible while maintaining integrity.

SUMMARY OF THE INVENTION

The present invention provides in a first embodiment, a multi-layered laminated paper structure that has at least two layers of an extensible kraft paper. The extensible kraft paper has a basis weight of 25-400 pounds per 3000 sq. ft. The multi-layered laminated paper structure also has one or more layers of a non-extensible kraft paper and a layer of adhesive which bonds each of the at least two layers of extensible or non-extensible kraft paper together to form a flexible multi-layer laminated paper structure.

The present invention provides in a second embodiment a multi-layer laminated paper structure that has three or more layers of extensible kraft paper. Each layer of the extensible kraft paper has a basis weight of 25-400 pounds per 3000 sq. ft. The multi-layer laminated paper structure also has a layer of adhesive which bonds each of the layers of extensible kraft paper together to form a flexible multi-layer laminated paper structure.

BRIEF DESCRIPTION OF THE DRAWINGS

FIG. 15 is a chart showing various alternative end panel constructions feasible in the present invention;

FIG. 19A is a perspective view of a slip sheet used in loading;

FIG. 19B is a perspective view of different slip sheets having various edges;

DETAILED DESCRIPTION

Figure 1:
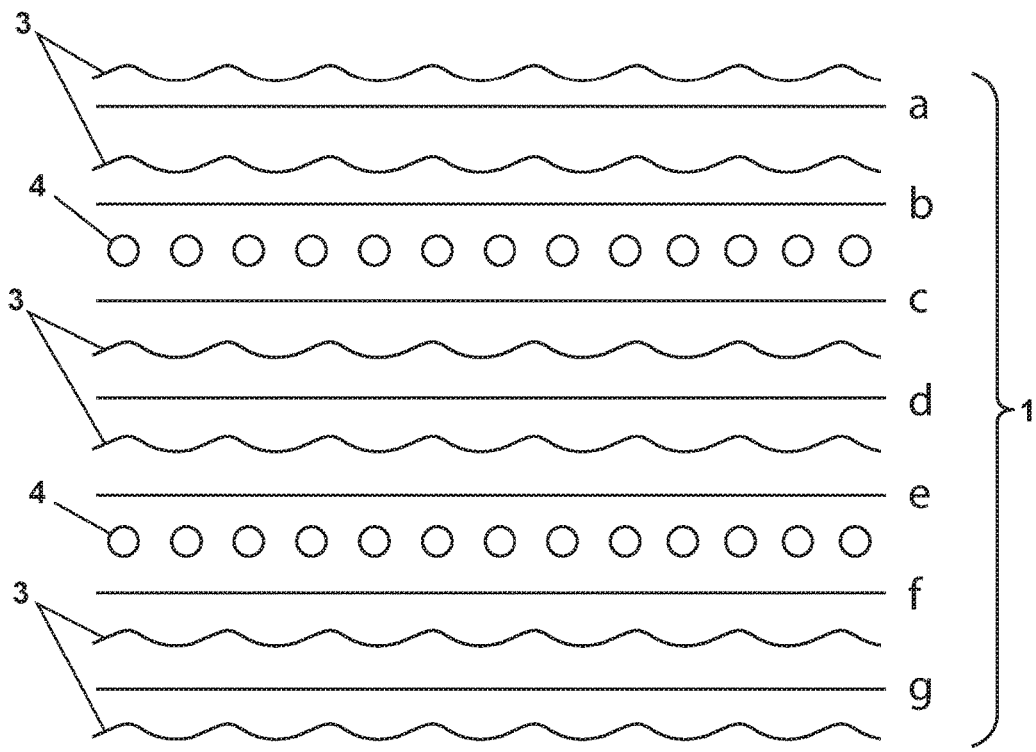
FIG. 1 illustrates a schematic of a multi-layered laminated paper structure according to various aspects described herein.

The described embodiments of the present disclosure are directed to the use of laminated extensible and non-extensible kraft paper in applications requiring rigidity and stiffness yet also flexibility. The present disclosure contemplates a flexible multi-layered paper structure that is capable of bending easily without breaking, can be modified in different ways, at different times or in different applications, without losing its rigidity or integrity. As used herein, the word flexible means that the paper structure is capable of bending easily without breaking, fracturing or fraying. In other words, the paper structure maintains its integrity despite being twisted, bent or flexed. It should be recognized, the multi-layer laminated paper structures described are not limited to the uses and applications described herein. The multi-layered paper structures described herein can be used in any application that requires rigidity, stiffness and flexibility.

In one aspect, the use of a multi-layer laminated paper structure (sometimes also referred to as a laminate or stack) can be used to replace high cost, plastic products, which are traditionally used for their flexibility and water resistance, with a lower cost, flexible and recyclable alternative. Additionally, the use of laminated extensible kraft paper products could replace heavier, inconsistent, and limited selection wood products with a flexible, recyclable, lower cost alternative. Aspects described herein can provide a product that bends and flexes in both the machine direction (MD) and cross machine direction (CD) without fracturing, breaking, or delaminating. Machine direction means the direction the paper web travels during manufacture. On the other hand, cross machine direction means the direction which is perpendicular to the direction the paper travels during manufacture. Aspects described herein can have water resistance, be recyclable, and have a cost advantage over plastic, for example, when used in automotive applications or processes. Thus, aspects described herein can provide the unique balance of characteristics typically found in plastic, but out of a sustainable resource that is economically efficient. One of the functional and structural advantages of the aspects described herein is the ability to change or engineer rigidity and stiffness characteristics with ease, at no additional cost, by how much stretch is imparted to each individual ply of the laminate, the amount and choice of adhesive and thereby the attributes of the finished multi-layered laminated paper structure.

In a specific example described herein, the multi-layered laminated paper structure can provide a product that is flexible enough to form when sewn to automotive seat cover fabrics or trim applications, as well as flexible enough for use in the sewing machine process. It will be understood, however, that the disclosure is not so limited to automotive seat parts and may have general applicability for many applications that would benefit from a flexible yet rigid and stiff structure, supplied in either rolls or sheets, including Recreational Vehicle (RV) sidewalls, roofs and floors, packaging for raw materials like paper or steel circular coils, wooden wraps for architectural furniture, fixtures, or structures, sheathing board for houses, molded or formed parts.

Paper stock known as "natural kraft paper" or "kraft paper" is a cellulose based material. Kraft paper can be used for applications such food packaging, paper grocery bags, and interleaving for metal or glass parts. Kraft paper is available in standard basis weights such as 25# (pounds per 3,000 square feet), 30#, 40#, 50#, 60#, 70#, and 80#. While kraft paper basis weight is generally specified in nominal units of pounds per 3,000 square feet, kraft linerboard can be specified in nominal units of pounds per 1,000 square feet. A basis weight of 50 pounds per 3000 square feet corresponds to a basis weight of about 17 pounds per 1000 square feet.

Most extensible (creped) papers are characterized by their ability to stretch. In the case of cement paper bags, "micro" crepes are put into the paper, usually as part of the paper formation process, to impart a certain level of stretch into the paper in order to provide an additional level of give or relief of pressure, which can be measured by tensile energy absorption, before fracture. Another type of crepe, e.g. party streamers, may exhibit large size crepes (in the "z" direction) for purposes of decoration. For decorative applications the tensile strength of the paper is not as important, therefore, a weaker, thinner, paper is used. The end use dictates the requirements for the material properties.

The term "extensible kraft paper", as used herein, refers to fully extensible kraft paper, semi-extensible kraft paper, and any other specialty grades of extensible kraft paper made whereby micro and/or macro stacking of the paper is done for decorative or high energy absorption properties. The creping process can be done in line while the paper is being manufactured or in a secondary, off line process, known to one with ordinary skill in the art. Depending on the fabrication and modifications of the equipment, the process can permit cross-directional creping and/or diagonal creping, sometimes called an all-directional stretch, which can have stretch as much as 100%, 200%, 300%, 400% or more. In addition, "extensible kraft paper", as used herein can be synonymously referred to as crepe paper, creped paper, stretchy paper, embossed paper, crinkled paper, semi-creped, primary creped, and/or machine-creped paper. Wet crepe and rubber belt machines rely on aqueous and/or steam processes in a secondary converting operation where the paper is moistened and passed over a roll equipped with a doctor blade to compact the paper. The process of crowding a sheet of paper on a roll using a doctor blade can produce an effect simulating crepe. Dry creping is a process in which a dry sheet is removed from a Yankee drier by a doctor blade and/or by means of a micro-creping process.

For applications requiring high strength and durability, a type of kraft paper known as "sack kraft paper" or "extensible kraft paper" can be used due to its high elasticity and high tear resistance properties. In some embodiments, extensible kraft paper may have a basis weight of 25-400 pounds per 3000 sq. ft. In other embodiments, the extensible kraft paper may have a basis weight of 50-300 pounds per 3000 sq. ft. In other embodiments, the extensible kraft paper may have a basis weight of 55-200 pounds per 3000 sq. ft. In other embodiments, the extensible kraft paper may have a basis weight of 60-100 pounds per 3000 sq. ft. In other embodiments, the extensible kraft paper may have a basis weight of 50-75 pounds per 3000 sq. ft. In other embodiments, the extensible kraft paper may have a basis weight of about 50 pounds per 3000 sq. ft., about 55 pounds per 3000 sq. ft., about 60 pounds per 3000 sq. ft., about 65 pounds per 3000 sq. ft., about 70 pounds per 3000 sq. ft., about 75 pounds per 3000 sq. ft., about 100 pounds per 3000 sq. ft., about 200 pounds per 3000 sq. ft., or about 300 pounds per 3000 sq. ft.

One way of testing the performance of paper or paperboard is to measure the bursting strength, known as Mullen. In a Mullen test (also called a pop or burst test), the paper sample is placed between two ring-like clamps in a device called a Mullen tester, and hydraulic pressure is used to inflate a rubber diaphragm, which expands against the sample stretching it. The measure of the total hydraulic pressure expanding the diaphragm at the time the sample ruptures (usually expressed in either pounds per square inch or kilopascals) is its bursting strength. Mullen tests are performed for each side of a paper or paperboard, and the bursting strength can be expressed as the average of both sides.

Furthermore, paper and paperboard product performance can be tested by measuring tensile breaking properties of the product, which can include tensile strength, stretch, tensile energy absorption, and tensile stiffness. Methods for determining the tensile breaking properties can include: T 494 om-01 "Tensile Properties of Paper and Paperboard (using constant rate of elongation apparatus)," TAPPI/ANSI, and ASTM D828 "Tensile Breaking Strength for Paper and Paperboard Using Constant Rate of Elongation Apparatus," American Society for Testing and Materials.

Tensile strength refers to the maximum tensile force developed in a test specimen before rupture on a tensile test carried to rupture under prescribed conditions. Tensile strength is the force per unit width of test specimen. Tensile strength is indicative of the strength derived from factors such as fiber strength, fiber length, and bonding. It may be used to deduce information about these factors, especially when used as a tensile strength index. For quality control purposes, tensile strength has been used as an indication of the serviceability of many papers which are subjected to a simple and direct tensile stress. Tensile strength can also be used as an indication of the potential resistance to web breaking of papers such as printing papers during printing on a web fed press or other web fed converting operations. When evaluating the tensile strength, the stretch and the tensile energy absorption for these parameters can be of equal or greater importance in predicting the performance of paper, especially when that paper is subjected to an uneven stress such as gummed tape, or a dynamic stress such as when a sack full of granular material is dropped.

Stretch refers to the maximum tensile strain developed in the test specimen before rupture in a tensile test carried to rupture under prescribed conditions. The stretch (or percentage elongation) is expressed as a percentage, i.e., one hundred times the ratio of the increase in length of the test specimen to the original test span. Stretch is indicative of the ability of paper to conform to a desired contour, or to survive non-uniform tensile stress. It should be considered important in all papers, but is of particular importance in papers where stress-strain properties are being modified or controlled. This includes creped paper, pleated paper, air-dried paper, and paper that has been made extensible through mechanical compaction. Stretch may be used as an indication of the amount of crepe in tissues, towels, napkins, and similar grades. Stretch is evaluated in decorative papers and certain industrial grades such as paper tapes and packaging papers, both as an index of how well the paper will conform to irregular shapes and, along with tensile energy absorption, as an indication of the paper's performance under conditions of either dynamic or repetitive straining and stressing. Stretch has also been found important in reducing the frequency of breaks on high-speed web fed printing presses such as are used to print newspapers.

Tensile energy absorption (TEA) refers to the work done when a specimen is stressed to rupture in tension under prescribed conditions as measured by the integral of the tensile strength over the range of tensile strain from zero to maximum strain. The TEA is expressed as energy per unit area (test span×width) of test specimen. Tensile energy absorption is a measure of the ability of a paper to absorb energy (at the strain rate of the test instrument), and indicates the durability of paper when subjected to either a repetitive or dynamic stressing or straining. Tensile energy absorption expresses the "toughness" of the sheet. An example of this is a multi-wall sack that is subject to frequent dropping. In packaging applications such as multi-wall sacks, favorable drop tests and low failure rates have been found to correlate better with tensile energy absorption than with tensile strength.

Tensile stiffness refers to the ratio of tensile force per unit width to tensile strain within the elastic region of the tensile-strain relationship. The elastic region of the tensile-strain relationship is the linear portion of the load-elongation relationship up to the elastic limit. The elastic limit is the maximum tensile force above which the load-elongation relationship departs from linearity. Tensile stiffness is numerically equivalent to E·t, where E is the modulus of elasticity and t is sample thickness. Tensile stiffness tells of the stiffness of the sheet and often gives a better indication of the mechanical response of the sheet to converting forces than the failure criteria.

Tear refers to the tear strength of paper. The tear strength is a measure of the resistance of a paper sheet to tearing force that it is subjected to. It is a physical property of paper and paperboard and is measured in both machine direction (MID) & cross machine direction (CD) and expressed as mili Newton (mN). Tearing resistance depends on the degree of fiber refining, related to inter fiber bonding, the fiber strength, the fiber length, the quality and quantity of fillers used. Fiber length and fiber bonding are typically the most important factors. Longer fibers increase the tear strength because the longer fibers are able to distribute stress over more fibers and more bonds, whereas short fibers concentrate stress in a smaller area. The direction of the fiber is another important parameter for tear strength, which is larger in lateral direction of the fiber than in longitudinal direction.

All directional references (e.g., radial, axial, proximal, distal, upper, lower, upward, downward, left, right, lateral, front, back, top, bottom, above, below, vertical, horizontal, clockwise, counterclockwise, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. Furthermore, "a set" as used herein can include any number of a particular element, including only one.

Figure 2:
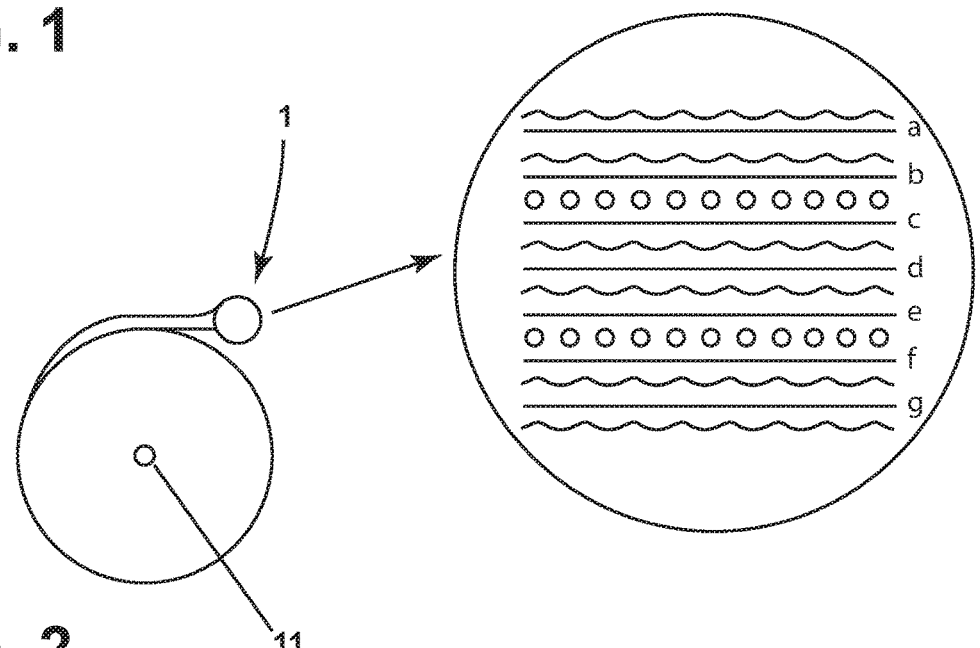
FIG. 2 illustrates a schematic of the multi-layered laminated paper structure of FIG. 1 rolled into a roll according to various aspects described herein.

FIG. 1 illustrates a non-limiting multi-layered laminated paper structure 1 including multiple plies a, b, c, d, e, f, and g, of 80# extensible kraft paper. The plies a, b, c, d, e, f, and g, can be joined together using an adhesive. A suitable adhesive can be, but is not limited to, polymers, such as a polyethylene, polypropylene, polyethylene terephthalate (PET), high density or low density blends of these polymers, and/or adhesive laminations such as a solvent, hotmelt, white glue, or waterproof glue in various forms known in the art. For example, a 100% low density polyethylene (LDPE) 3 and a water proof glue 4 can be used to join plies a, b, c, d, e, f, and g. FIG. 1 illustrates an example where plies a and b, plies c, d and e, and plies f and g are joined with the 100% LDPE 3, and the water proof glue 4 is used to join plies b and c together, and plies e and f together, to form a 7-ply laminated paper structure 1. In one example, approximately 1.5 mils (0.059 inches) of black pigmented 100% LDPE can be deposited, or coated, on the outside surface of plies a and g for appearance. In some instances, the thickness and blend of the coating on the outside surface may have a functional attribute. As 100% LDPE has a soft characteristic when solidified, the amount applied can add to the pliability of the outside layer. The 1.5 mils (0.059 inches) can provide a sufficient amount of stretch around a small radius without fracturing the laminate 1. The thickness and blend of the coating can be more or less depending on the application and is not limited to 1.5 mil (0.059 inches) of black pigmented LDPE. Each ply a, b, c, d, e, f, and g can be approximately 0.1651 mm (0.0065 inches) thick, have an average machine direction (MD) tensile strength of 12.9 kN/m, and an average cross direction (CD) tensile strength of 5.8 kN/m. Furthermore, each ply a, b, c, d, e, f, and g can have a MD tensile energy absorption (TEA) average of 633 $J/m^2$, a CD TEA average of 367 $J/m^2$, and a total TEA average of 1000 $J/m^2$. Additionally, each ply a, b, c, d, e, f, and g can have an MD tear average of 1626 mN, a CD tear average of 2731 mN, a MD stretch average of 12.2%, and CD stretch average of 9.3%. Furthermore, each ply a, b, c, d, e, f, and g can have a puncture, or Mullen, of 144 psi. The multi-layered laminated paper structure 1 can have a final thickness of approximately 1.016 mm (0.040 inches), 1.524 mm (0.060 inches), or 2.032 mm (0.080 inches) or more, depending on the thickness of each of plies a, b, c, d, e, f, and g, and the thickness of the adhesive and/or coating layers. FIG. 2 illustrates the multi-layered laminated paper structure 1 of FIG. 1, in a roll form where the multi-layered laminated paper structure 1 is wound into a roll 11.

The inventor envisions endless combinations in the number of plies chosen, the basis weights of the papers chosen, the types of materials chosen, the stretch percentages chosen, and the adhesive combinations chosen. While FIG. 1 and FIG. 2 illustrate the multi-layered laminated paper structure 1 having seven plies of 80# extensible kraft paper, the laminated structure can include more than seven or less than seven plies where each ply can have a variety of weights ranging from 25#/3000 square feet to 400#/3000 square feet. Each ply can have varying stretch properties. In some embodiments, each ply of the multi-layered laminated paper structure 1, can have varying stretch properties of 0% to 400%. In some embodiments, each ply of the multi-layered laminated paper structure 1, can have varying stretch properties of 10%-300%. In some embodiments, each ply of the multi-layered laminated paper structure 1, can have varying stretch properties of 20%-200%. In some embodiments, each ply of the multi-layered laminated paper structure 1, can have varying stretch properties of 30%-100%. In some embodiments, each ply of the multi-layered laminated paper structure 1, can have varying stretch properties of 40%-50%. In some embodiments, from about 0% to less than about 400%, from about 10% to less than about 300%, from about 20% to less than about 200%, from about 30% to less than about 100%, from about 40% to less than about 50%. For example, the multi-layered laminated paper structure 1, can include seven plies of an extensible kraft paper, each ply having a 10% stretch. The multi-layered laminated paper structure 1 can also include a laminate of five plies of extensible kraft paper having 10% stretch, and two plies of extensible kraft paper having 100% stretch. In another example, the multi-layered laminated paper structure 1 can include six plies of extensible kraft paper having 10% stretch and one ply of non-extensible kraft paper with zero stretch. Additionally, interchanging the attributes of each ply of extensible kraft paper in the multi-layered laminated paper structure can be beneficial to correspond with the performance requirements of the end use for the laminated paper structure. For example, altering the stretch percentage of a single ply of the laminate can change the flexibility of the laminate and performance can vary. Additionally, changing the adhesive choice or the thicknesses of the adhesive can change the flexibility of the laminate and the performance can vary.

Figure 3A:
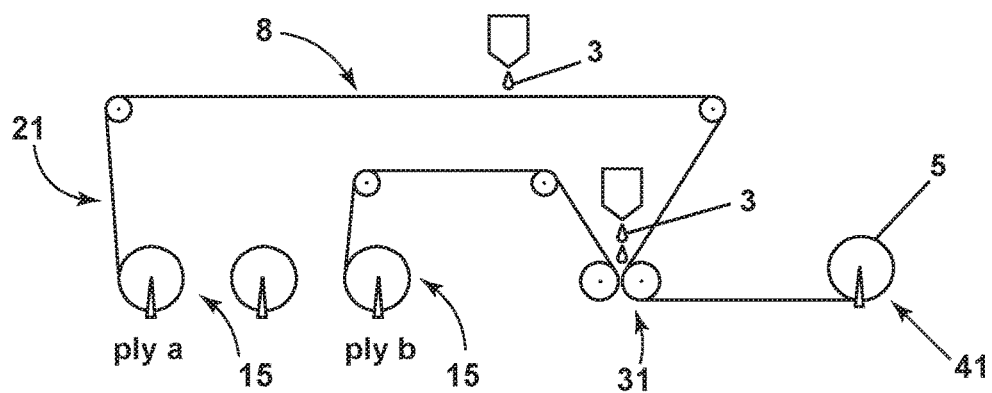
FIG. 3A illustrates a schematic process for roll to roll extrusion lamination according to various aspects described herein.

FIG. 3A illustrates a schematic process for roll to roll extrusion lamination of plies a and b to form a 2-ply laminate 5. Ply a and b are placed on roll stands 15 and fed through an extrusion machine 21. As ply a travels through the machine 21, an adhesive coating 3 is applied to the exposed surface 8 of ply a. For example, the coating can be the 100% LDPE 3. An example quantity of the coating can be approximately 1.5 mils (0.059 inches), without limitation. The adhesive coating can include pigments for aesthetics, which could be black or any other desired color. The pigments can be included to perform a function. For example, white or silver pigments can be used to reflect heat. Additionally, the adhesive coating can have sufficient softness to stretch without breaking due to an increased circumference. The adhesive coating can also be polypropylene, polyethylene terephthalate (PET), high density or low density blends of these polymers. For example, blends of 50% linear low density polyethylene (LLDPE) and 50% high density polyethylene (HDPE) may be chosen, without limitation, in a variety of proportions. Ply b simultaneously travels through the extrusion machine 21 and can be joined to ply a at pressure rollers 31. Plies a and b can be permanently joined using the 100% LDPE 3 as the adhesive to form the 2-ply laminate 5. An example quantity of the adhesive can be approximately 1 mil (0.039 inches), without limitation. The adhesive coating can be clear or pigmented. The laminate 5 can be rolled up on roll stand 41 for further processing.

Figure 3B:
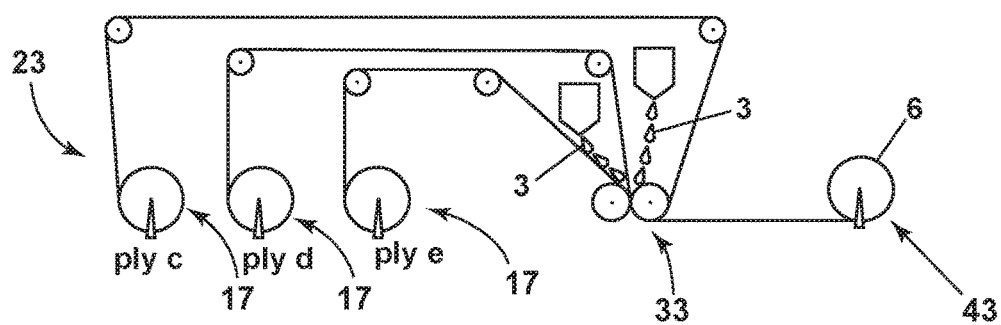
FIG. 3B illustrates a schematic process for roll to roll extrusion lamination according to various aspects described herein.

FIG. 3B illustrates a schematic process for roll to roll extrusion lamination of plies c, d, and e to form a 3-ply laminate 6. Plies c, d, and e, are placed on roll stands 17 and fed through an extrusion machine 23. Plies c, d, and e can be permanently adhered together at pressure rollers 33. An example of a suitable adhesive 3 is the 100% LDPE 3. An example quantity of the adhesive can be approximately 1 mil (0.039 inches), without limitation. The laminate 6 can be rolled up on roll stand 43 for further processing.

Figure 3C:
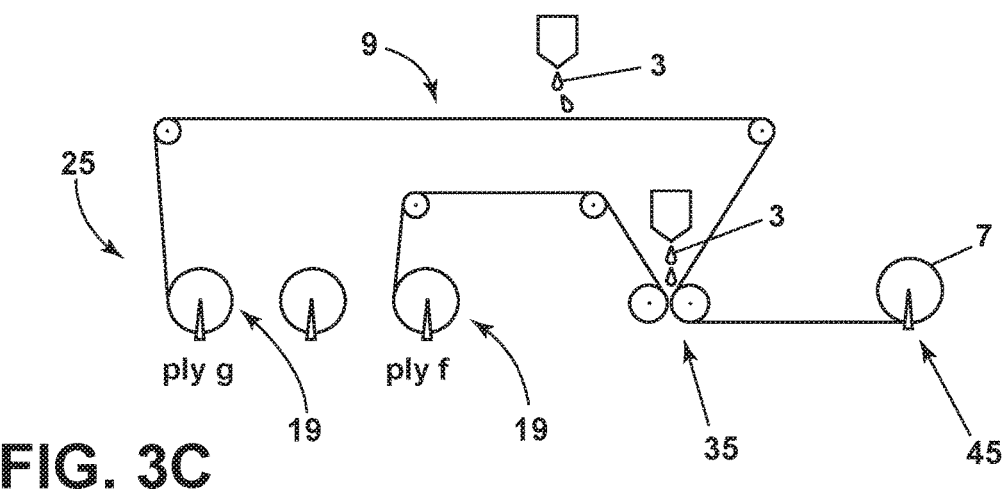
FIG. 3C illustrates a schematic process for roll to roll extrusion lamination according to various aspects described herein.

FIG. 3C illustrates a schematic process for roll to roll extrusion lamination of plies g and f to form a 2-ply laminate 7. Ply f and g are placed on roll stands 19 and fed through an extrusion machine 25. As ply g travels through the machine 25, an adhesive coating 3 is applied to the exposed surface 9 of ply g. For example, the adhesive coating can be a 100% LDPE 3. An example quantity of the coating can be approximately 1.5 mil (0.059 inches), without limitation. Ply f simultaneously travels through the machine 25 and can be joined to ply g at pressure rollers 35. Plies g and f can be permanently joined using an adhesive 3 such as 100% LDPE 3 as the adhesive to form the 2-ply laminate 7. An example quantity of the adhesive coating can be approximately 1 mil (0.039 inches), without limitation. The laminate 7 can be rolled up on roll stand 45 for further processing.

Figure 3D:
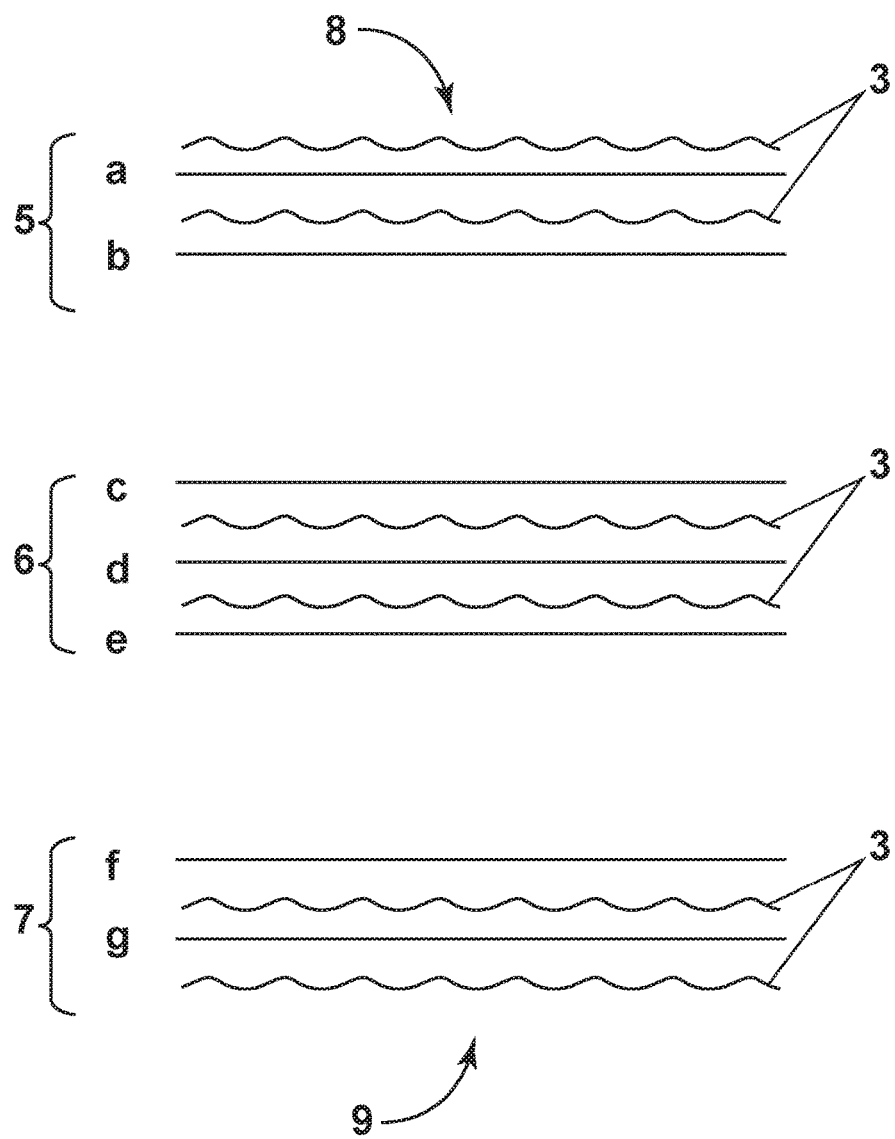
FIG. 3D illustrates a schematic view of laminates according to various aspects described herein.

FIG. 3D illustrates a schematic view of laminates 5, 6, and 7. Laminates 5 and 7 can have a finished thickness of approximately 0.015 thousands of an inch, without limitation. Laminate 5 includes the exposed layer 8 of adhesive 3 such as 100% LDPE and an unexposed layer of adhesive 3 such as 100% LDPE polyethylene, which adheres the two plies a and b together. Likewise, laminate 7 includes an exposed layer 9 of adhesive 3 such as 100% LDPE and the unexposed layer of adhesive 3 such as 100% LDPE, which adheres the two plies f and g together. Laminate 6 can have a finished thickness of approximately 0.5588 mm (0.022 inches) and two unexposed layers of adhesive 3, which adheres the three plies c, d, and e together.

Figure 4:
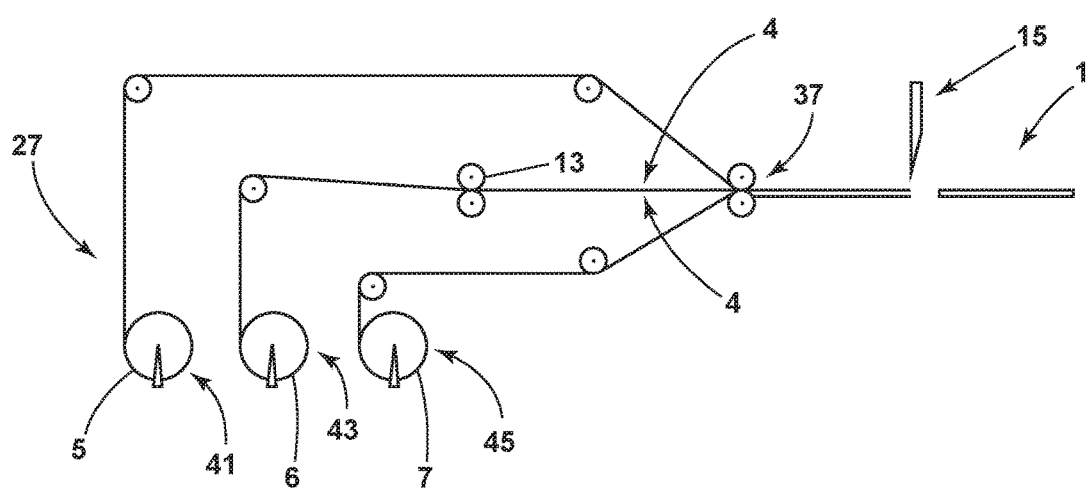
FIG. 4 illustrates a schematic process for roll to sheet lamination according to various aspects described herein.

FIG. 4, illustrates a schematic view of the 3 ply roll to sheet lamination process of laminates 5, 6, and 7, produced on the roll to roll extrusion process, FIG. 3A, 3B, or 3C, to form the 7-ply multi-layered laminated paper structure 1. The laminates 5, 6, and 7, in roll form, are placed on roll stands 41, 43, 45, respectively. Laminates 5, 6, and 7 can be fed into the laminating machine 27. Laminate 6 can pass through a glue station 13, where a water-proof adhesive 4, or a white glue, can be applied to the top and bottom surface of the laminate 6. Next, laminate 6 can be combined with laminate 5 and laminate 7 via pressure rollers 37 to form the multi-layered laminated paper structure 1, with the adhesive coating 4, from the glue station 13. The multi-layered laminated paper structure 1, can have an approximate thickness of 1.524 millimeters (0.060 inches), as it passes through a cutting section 15, severing the multi-layered laminated paper sheet 10 to a desired length. The roll to sheet lamination process of FIG. 4 may provide for 3, 4, 5, 6, 7 or more plies without limitation. Alternatively, it may be desired to feed the multi-layered laminated paper structure off into a roll, such as the roll 11 illustrated in FIG. 2.

Figure 5A:
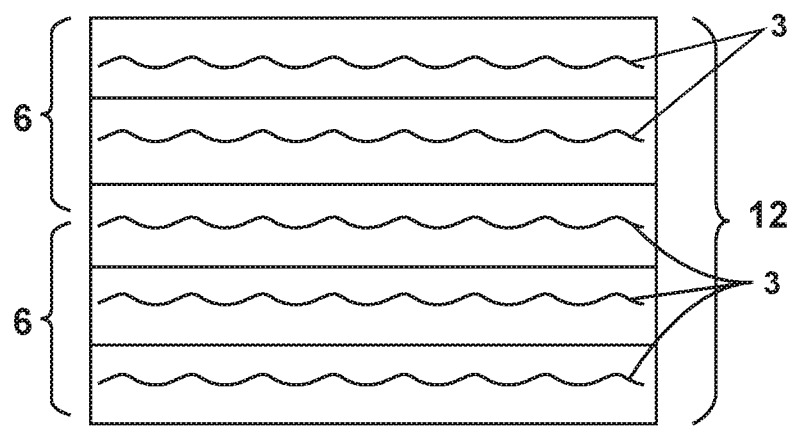
FIG. 5A illustrates a schematic of a multi-layer laminated paper structure according to various aspects described herein.
Figure 5B:
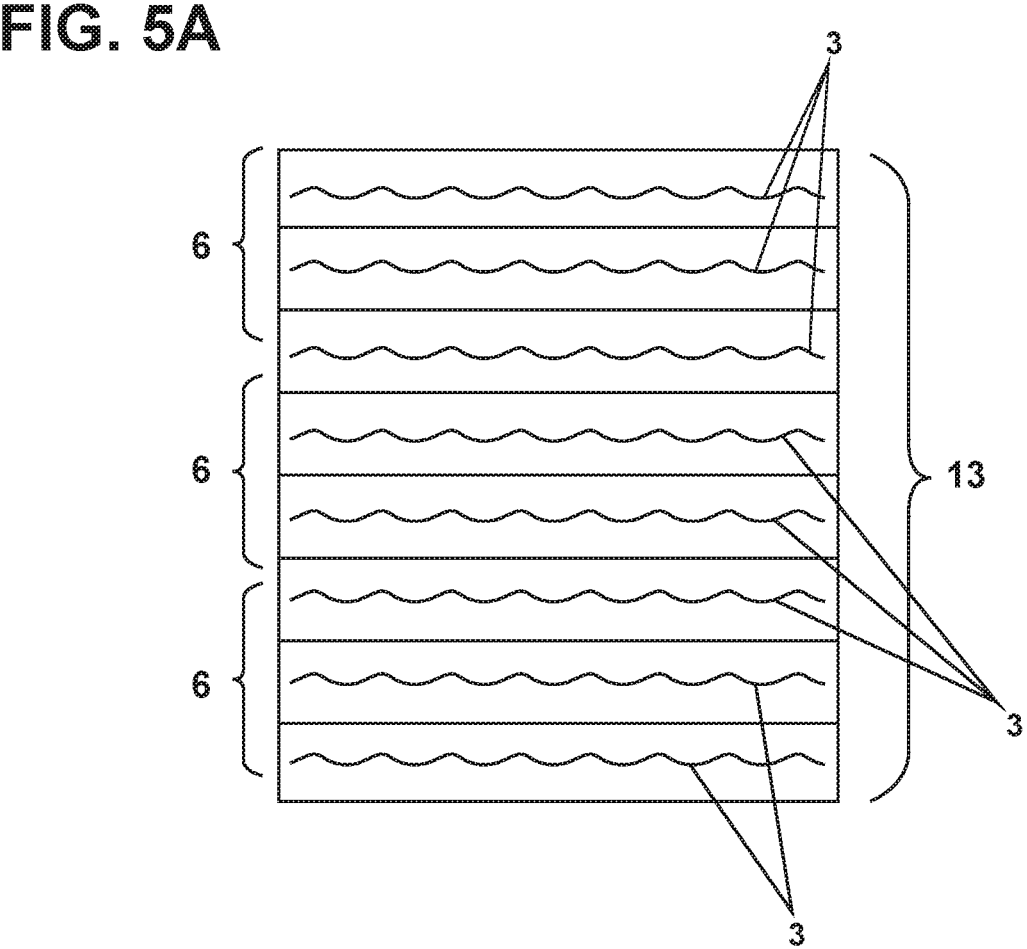
FIG. 5B illustrates a schematic of a multi-layer laminated paper structure according to various aspects described herein.

FIG. 5A illustrates another embodiment of a multi-layered laminated paper structure 12, which can include two rolls of laminate 6, each having a thickness of approximately 0.5588 mm (0.022 inches), without limitation. The laminates 6 can be used with the extrusion lamination machines 21, 23, or 25 of FIG. 3 A, B or C and an adhesive 3 such as the 100% LDPE to adhere the roll laminates 6, to form the multi-layered laminated paper structure 12 when the laminates 6 pass through the compression rolls 31, 33, or 35. Then, the multi-layered laminated paper structure 12 can be rolled up on a roll stand 41 and can have an average thickness of 1.146 mm (0.045 inches). In another embodiment, FIG. 5B illustrates a multi-layered laminated paper structure 13, which can include three rolls of laminate 6. The laminate 6 can be used with the extrusion machine 23 of FIG. 3B, without limitation, and the adhesive 3 can be used to join the three roll laminates 6 to form the multi-layered laminated paper structure 13 as they pass through the compression rolls 33. Then, the multi-layered laminated paper structure 13 can be rolled up on roll stand 43 and can have approximate thickness of 1.7018 millimeters (0.067 inches). FIG. 5A and FIG. 5B are illustrative of multi-layered laminated paper structures produced with the roll to roll extrusion process from FIG. 3A, 3B or 3C. However, aspects of the present disclosure foresee the use of any roll to roll lamination process and can provide for a variety of multi-layered laminated paper structures that can be formed by using combinations of laminates, adhesives, and plies as described herein.

Figure 6:
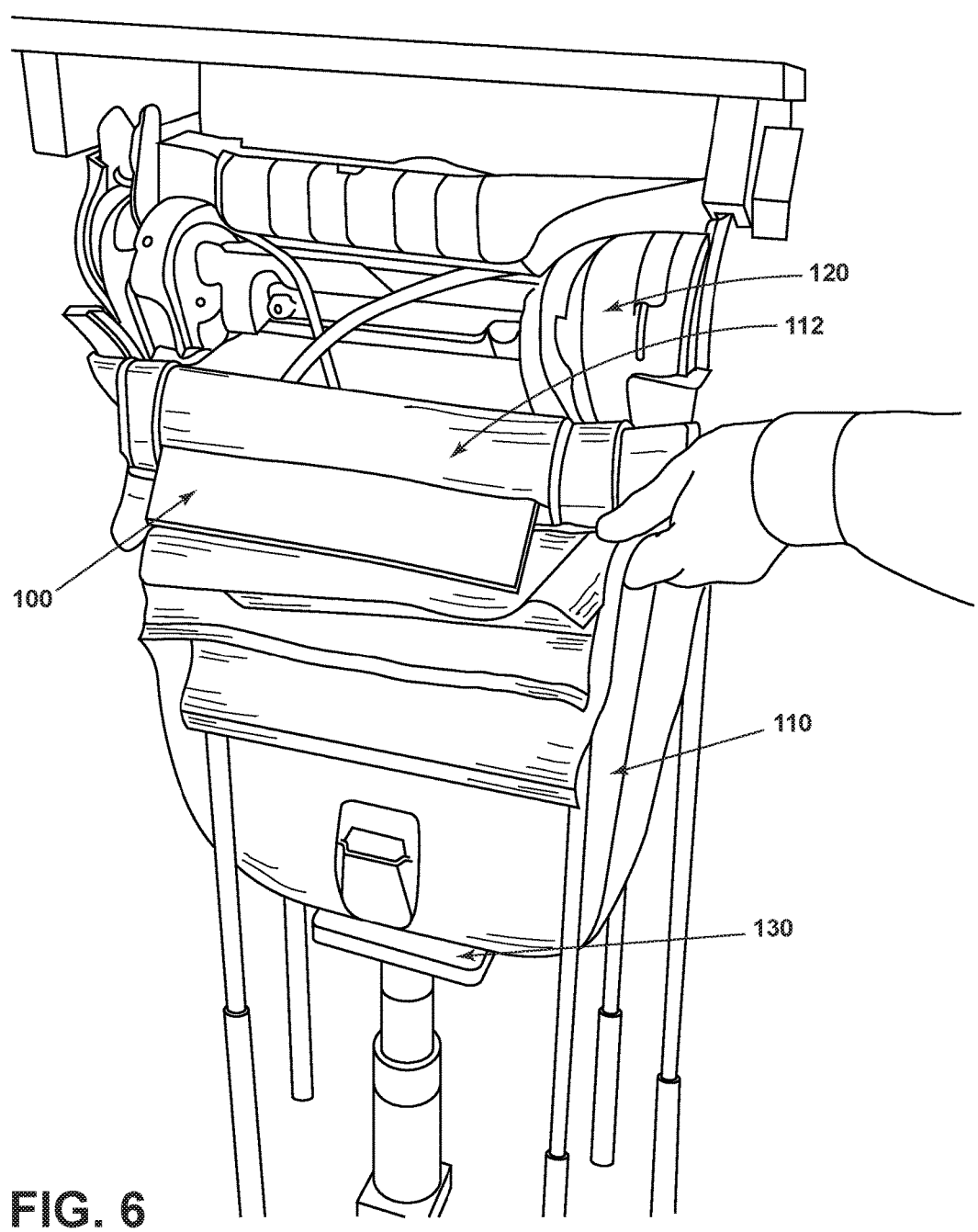
FIG. 6 illustrates a stiffener undergoing an inversion process according to various aspects described herein.
Figure 7:
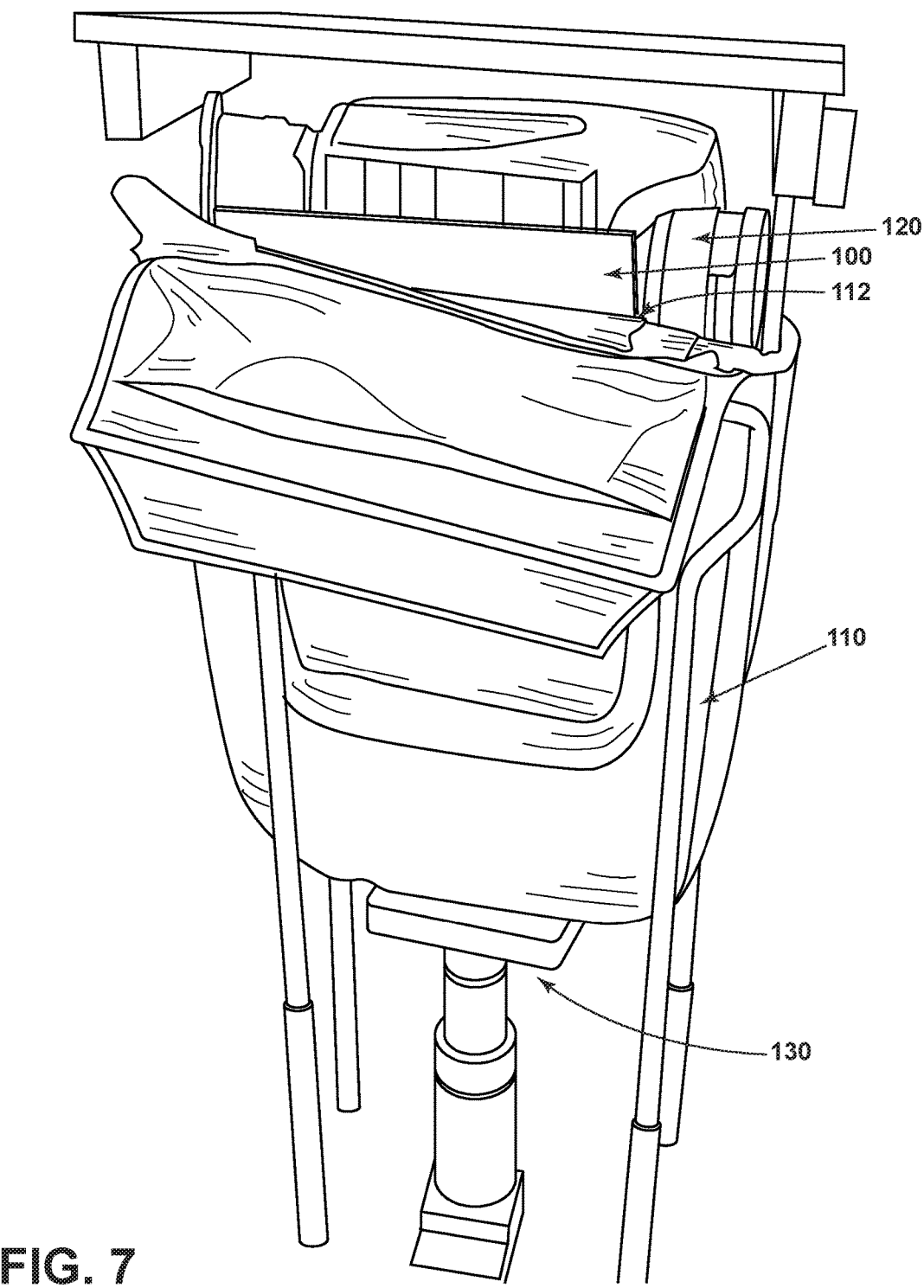
FIG. 7 illustrates the stiffener undergoing an inversion process of FIG. 6 according to various aspects described herein.

Turning to FIG. 6, a stiffener is shown undergoing an inversion process. Here, a vehicle seat 120 is shown upside down and mounted onto an inverter assembly 130. The multi-layered laminated paper structure 1 is shown in the form of a stiffener 100 inserted within a sleeve 112 of a seat fabric 110. The multi-layered laminated paper structure 1 can be die cut to a desired shape to form the stiffener 100. The stiffener 100 can have dimensions of about 330.2 mm (13 inches) by 330.2 mm (13 inches), and thicknesses of about 2.032 mm (0.080 inches), 1.524 mm (0.060 inches), or 1.016 mm (0.040 inches). To assemble the seat fabric 110 on the vehicle seat 120, the seat fabric 110 is turned inside out and placed over the inverter assembly 130. The stiffener 100 and any other trim pieces are placed within the inside cavities of the seat fabric sleeve 112. As the metal frame of the vehicle seat 120 moves downward, the sleeve 112 of the seat fabric 110 wraps around the vehicle seat 120. The stiffener 100 forms around a mandrel having a diameter of approximately 25.4 mm (1 inch) during the seat fabric 110 wrapping process, and must do so without fracturing or breaking. Thus, the stiffener 100 needs to be stiff, yet flexible enough to make it through the inverter process. FIG. 7 illustrates the stiffener 100 on the vehicle seat 120 at the end of the inversion process after the stiffener has been wrapped around the mandrel.

Figure 8:
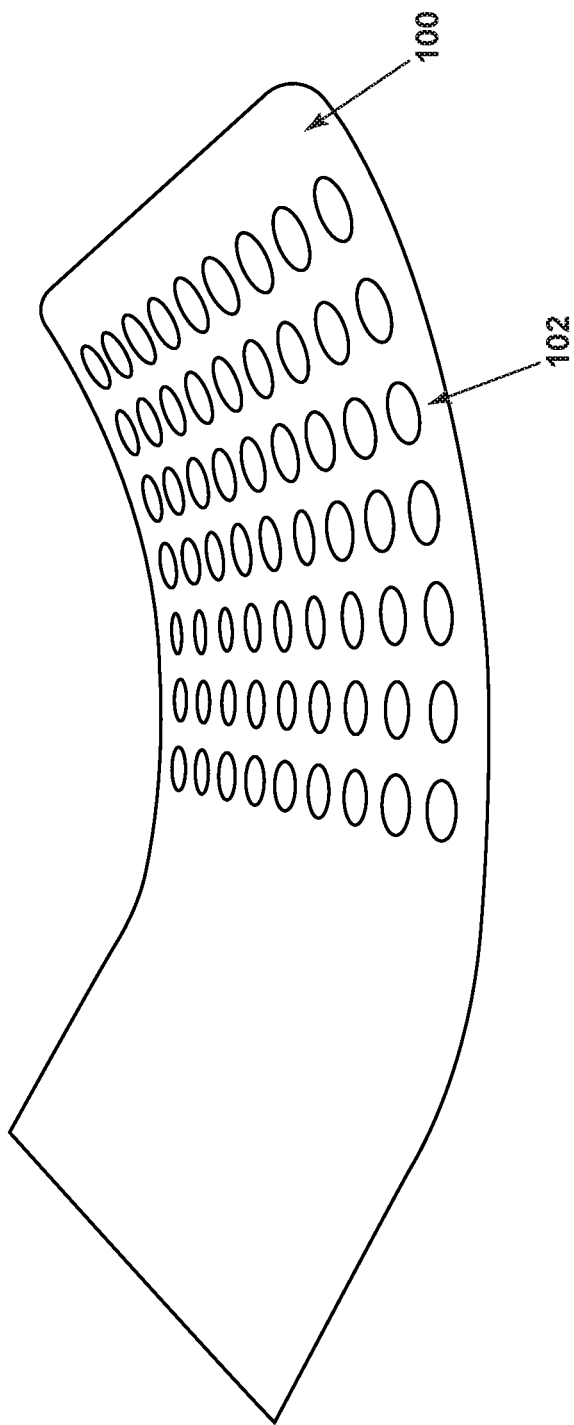
FIG. 8 illustrates a stiffener according to various aspects described herein.
Figure 9:
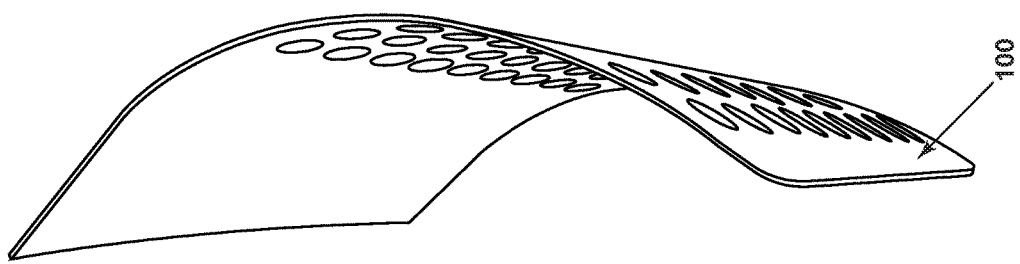
FIG. 9 illustrates the stiffener of FIG. 8 according to various aspects described herein.

FIG. 8 and FIG. 9 show the stiffener 100 after the stiffener 100 has undergone the inversion process, but removed from the vehicle seat pocket 112 in order to more clearly see the characteristics of the stiffener 100. The stiffener 100 is slightly bent, but is not fractured or damaged due to the performance of the multi-layered laminated paper structure 1. In addition, the stiffener 100 can comprise one or more apertures 102 for increasing flexibility and reducing weight of the stiffener 100. As illustrated, the apertures 102 can be in a matrix formation with about 7 rows by 9 columns of apertures that are approximately 0.75 inches-to 1 inch in diameter. While the apertures 102 are shown as circles in matrix form in FIG. 8 and FIG. 9, the apertures can include any suitable shape and orientation. For example, the apertures can have a rectangular shape and can be located anywhere on the stiffener 100.

Figure 10:
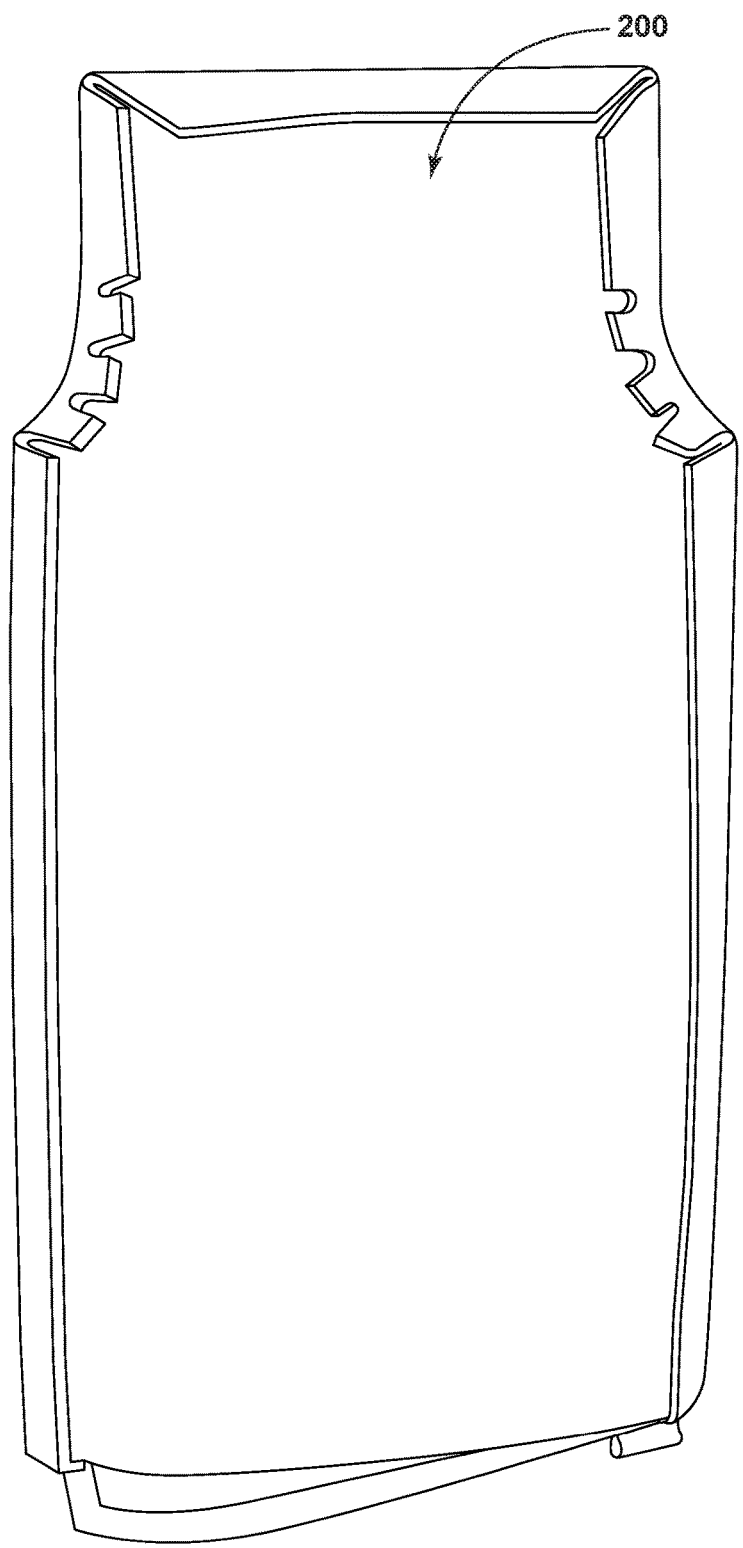
FIG. 10 illustrates a stiffener according to various aspects described herein.
Figure 11:
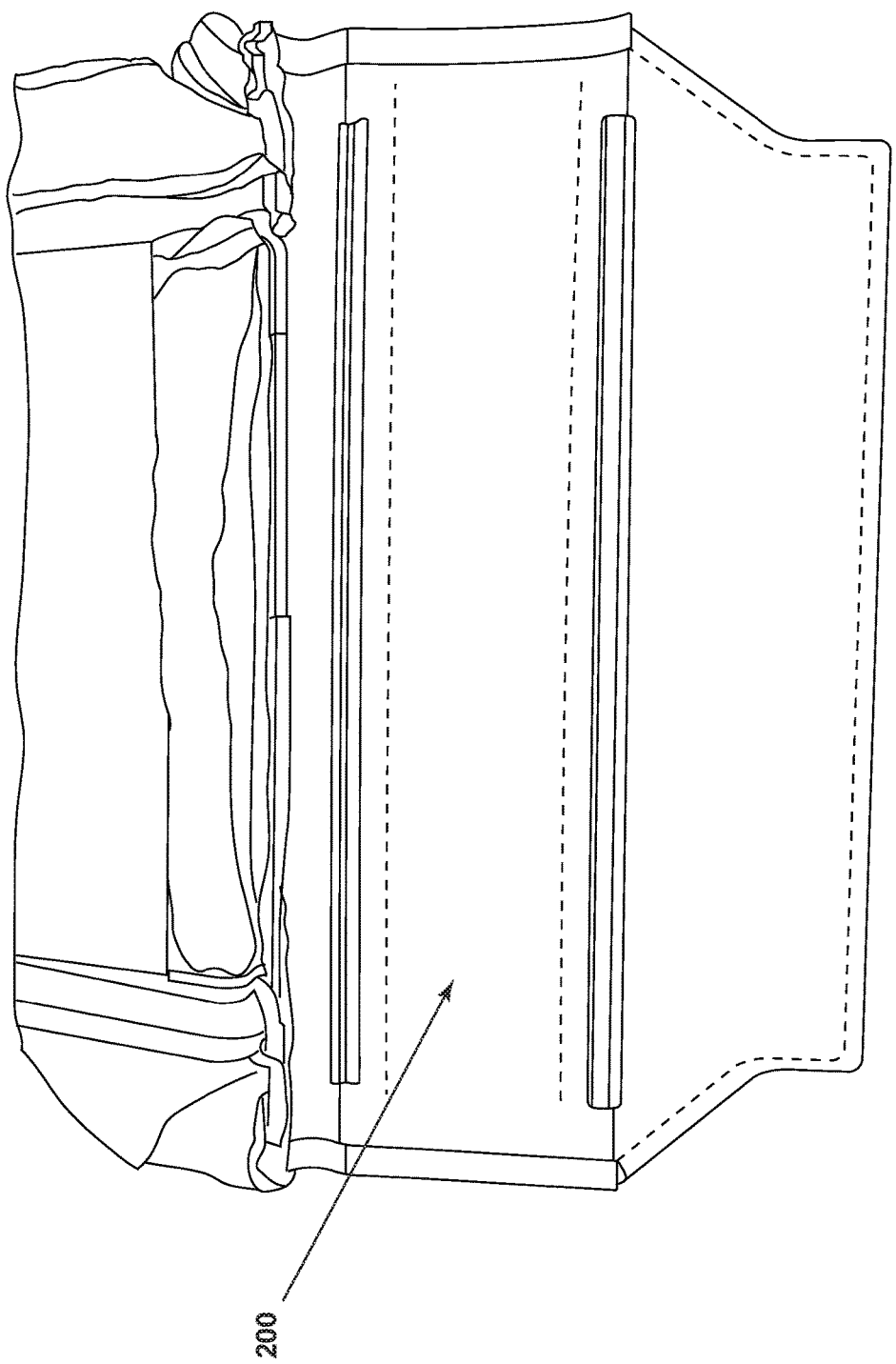
FIG. 11 illustrates a stiffener according to various aspects described herein.

FIG. 10 and FIG. 11 show the multi-layered laminated paper structure 1 in the form of vehicle trim pieces 200 that are sewn into the part. The performance of the multi-layered laminated paper structure 1 allows for the trim pieces to be soft enough for needles of a sewing machine to perforate the trim pieces, yet rigid enough to provide stiffness to the part.

Aspects of the present disclosure provide for a variety of benefits, including the use of thick laminates of extensible kraft paper used in any application that requires rigidity, stiffness and flexibility where either wood or plastic are typically the materials of choice. In particular, aspects described herein can be beneficial to applications requiring flexibility up to 360 degrees, yet the part cannot shatter, splinter, and delaminate. Many automotive seats use a piece of plastic as stiffener in order to hold fabrics in place and to provide protection. Aspects described herein can provide for an effective alternative to a plastic part.

Figure 12:
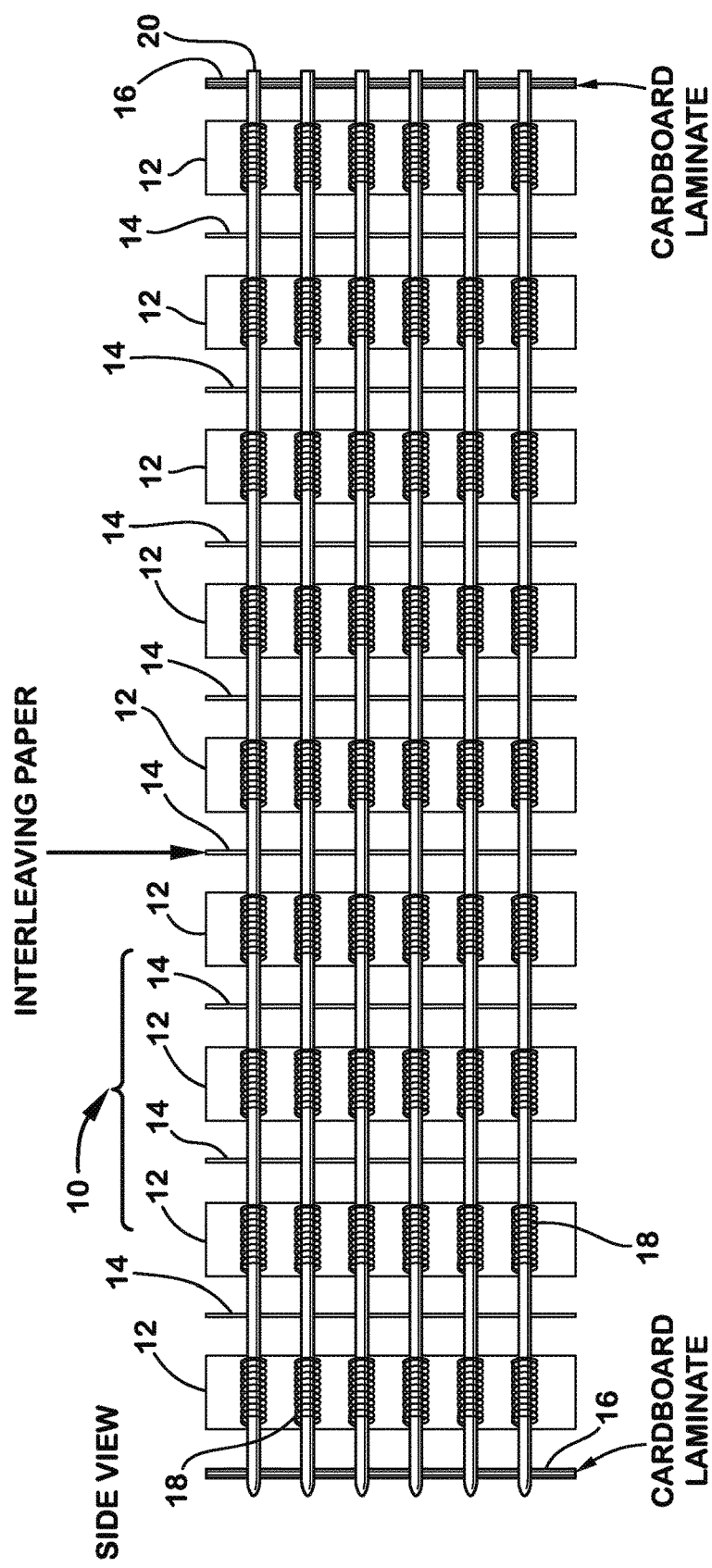
FIG. 12 is a schematic side view of a stack of mattress coil springs separated by interleaving sheets prior to being compressed together.
Figure 13:
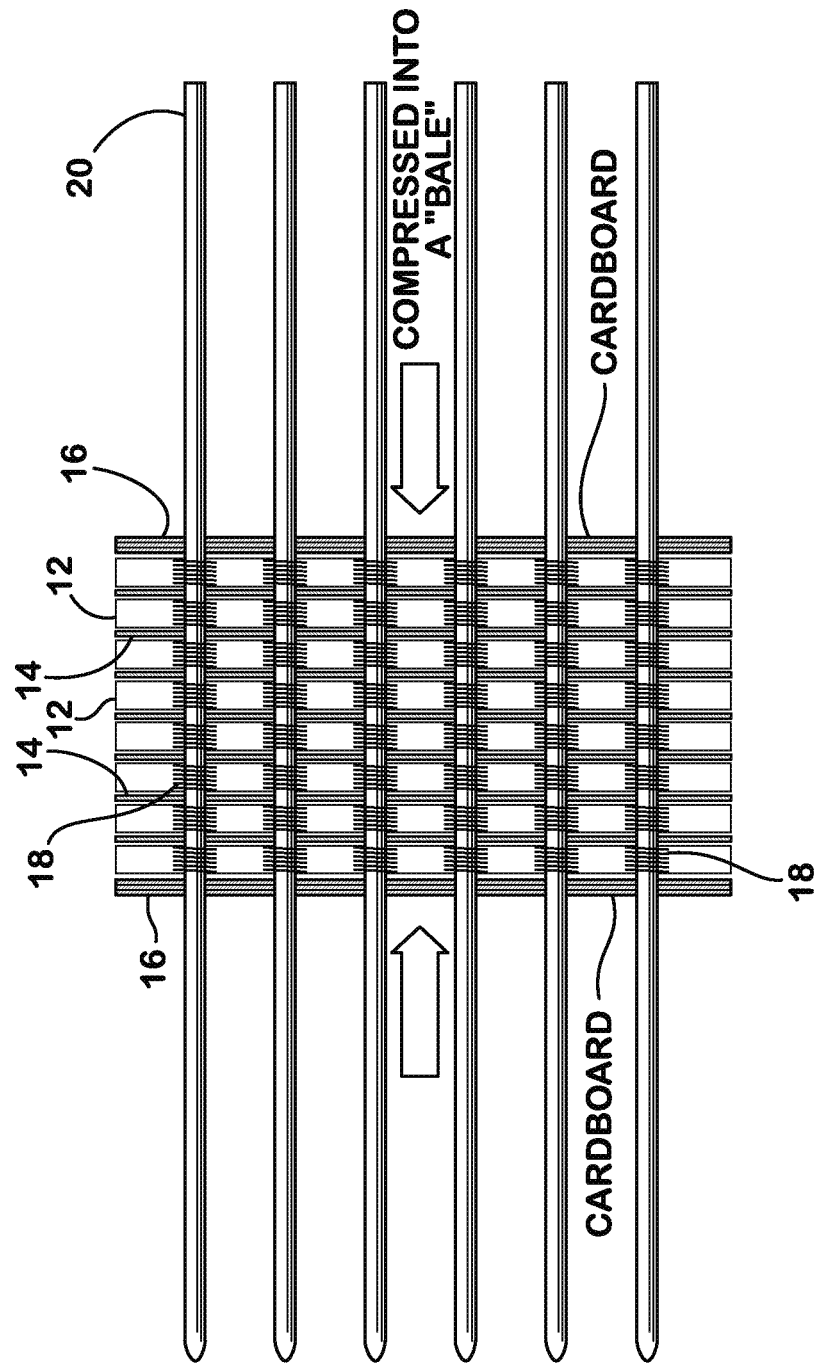
FIG. 13 is a schematic side view showing a compressed stack of mattress cores separated by interleaving sheets and having end panels on the outer sides thereof and being bound together in compressed form for shipping.

FIGS. 12-28 show other aspects, embodiments and uses of multi-layered laminated paper structures. For example, FIG. 12 shows a stack 10 of mattress spring cores 12 or mattress spring coils 12 separated by interleaving paper 14 and having end panels 16 on the outer ends of the stack. The individual mattress spring cores 12 each comprise a plurality of spaced coil spring elements 18 fastened together to form a spring coil mat. The coils 18 in overlapping mattress cores 12 are in general alignment.

The stack 10 or plurality of mattress spring coils 12 can comprise 4-15 mattress spring coils, 6-12 mattress spring coils, 8-10 mattress spring coils, about 6 mattress spring coils, about 7 mattress spring coils, about 8 mattress spring coils, about 9 mattress spring coils, about 10 mattress spring coils, about 11 mattress spring coils, or about 12 mattress spring coils.

The term "linerboard", as used herein refers to linerboard, natural kraft paper, high performance linerboard, and any other specialty grades of linerboard known to one with ordinary skill in the art.

In one embodiment, the interleaving paper 14 is a single layer or piece of extensible kraft paper having a basis weight of 35-150 pounds per 3000 sq. ft. In another embodiment, the interleaving paper can be two layers of non-laminated extensible kraft paper, each layer or piece of extensible kraft paper having a basis weight of 35-150 pounds per 3000 sq. ft. In another embodiment, the interleaving paper can be three or more layers or pieces of non-laminated extensible kraft paper, each layer or piece of extensible kraft paper having a basis weight of 35-150 pounds per 3000 sq. ft.

Figure 14:
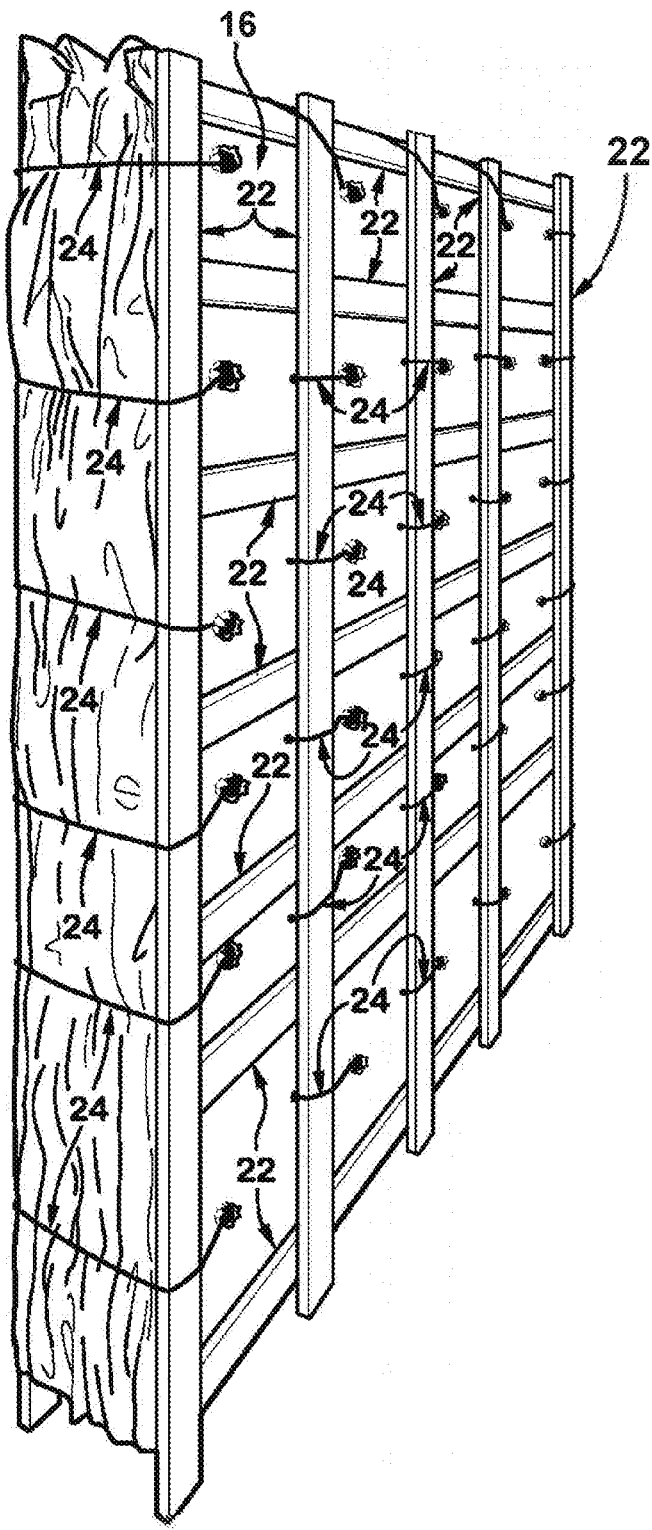
FIG. 14 is a perspective view showing the compressed and bound stack of mattress cores.

After the stack 10 of mattress cores 12 has been formed with the interleaving papers 14 and end panels 16 in place, a plurality of spears 20 (FIG. 13) are inserted through the coils 18 and through the end panels 16 and interleaving sheets 14 in order to hold the coils in alignment for compression. The coils 18 are shown in their uncompressed state in FIG. 12. Wood boards of panels 22 (FIG. 14) are then placed against the outer sides of the stack 10 and the stack 10 is compressed in a press, generally a horizontal hydraulic press. The mattress spring cores 12 are shown in a compressed bundle in FIG. 13. When the bundle of mattress spring cores 12 and coil spring elements 18 are fully compressed, the bundle is bound together in the compressed state by conventional bands, straps, or tie wires 24 (FIG. 14). The bundle is thereafter shipped to its destination, where the mattress spring cores 12 are then unbundled and decompressed, and the individual mattress spring cores 12 are thereafter covered with padding and fabric in order to complete the mattress construction.

One important feature is that the end panels 16 positioned on the outer sides of the stacks are relatively thin, easily pierceable members formed of a lamination or a laminated paper stack panel having at least one and up to three layers of extensible kraft paper laminated together with water soluble glue. Other types of glue known in the art for adhering paper layer may be used. The use of "extensible" kraft paper instead of the conventional linerboard is important. Extensible kraft paper is a specific type of relatively thin paper that has been subjected to additional processing during manufacture that makes the paper somewhat stretchable. This type of paper is generally used in cement bag or bag applications with a single ply or two plies of a non-laminated paper which benefits from being somewhat stretchable. Generally, extensible kraft paper is not used in laminated paper products. The stretchability and thinness of extensible kraft papers generally make them undesirable for use in laminated paper products, because thin and stretchy paper cannot be used in known automated laminating machinery and can only be processed in smaller batches. Notwithstanding the increased material cost on a unit weight basis and notwithstanding the added manufacturing cost of a non-automated laminating process, the use of laminated extensible kraft paper in the end panels provides cost savings and performance benefits in the present invention. Likewise, the use of extensible kraft paper for the interleaving paper provides desirable strength and tear resistance while retaining desirable pierce-ability attributes.

While some embodiments of the present invention employ end panels 16 formed of three layers of extensible kraft paper laminated together with a water soluble glue, other constructions are feasible. For example, the end panels can be formed by gluing two layers of extensible kraft paper with one layer of linerboard, or the end panels can be formed by gluing one layer of extensible kraft paper with two layers of linerboard. Multiple examples of feasible laminate constructions are shown in FIG. 15. FIG. 15 is not meant to be limiting since other combinations of laminate layers in light of this disclosure could be determined.

When the laminated end panels or laminated paper stack panel includes three layers of extensible kraft paper, the individual weights of the three different paper layers may all vary. As shown in FIG. 15, the first layer or ply of the three layers of extensible kraft paper can have a basis weight of 35-150 pounds per 3000 sq. ft. In some embodiments the first ply can have a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The second layer or ply of the three layers of extensible kraft paper can have a basis weight of 35-150 pounds per 3000 sq. ft. In some embodiments the second ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., a basis weight of about 80 pounds per 3000 sq. ft., a basis weight of about 85 pounds per 3000 sq. ft., a basis weight of about 90 pounds per 3000 sq. ft., a basis weight of about 95 pounds per 3000 sq. ft., or a basis weight of about 100 pounds per 3000 sq. ft. The third layer or ply of the three layers of extensible kraft paper can have a basis weight of 35-150 pounds per 3000 sq. ft. In some embodiments the third ply can have a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft.

When the laminated end panels or laminated paper stack panel comprises two layers of extensible kraft paper and one layer of linerboard, the individual weights of the three different layers may all vary. As shown in FIG. 15, the first layer or ply of extensible kraft paper can have a basis weight of 35-150 pounds per 3000 sq. ft. In some embodiments the first ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The second layer or ply made of linerboard can have a basis weight of 10-90 pounds per 1000 sq. ft. In some embodiments the second ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 pounds per 1000 sq. ft. The third layer or ply of extensible kraft paper can have a basis weight of 35-150 pounds per 3000 sq. ft. In some embodiments, the third ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft.

When the laminated end panels or laminated paper stack panel comprises one layer of extensible kraft paper and two layers of linerboard, the individual weights of the three different layers may all vary. As shown in FIG. 15, the first layer or ply of linerboard can have a basis weight of 10-90 pounds per 1000 sq. ft. In some embodiments the first ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 pounds per 1000 sq. ft. The second layer or ply of extensible kraft paper can have a basis weight of 35-150 pounds per 3000 sq. ft. In some embodiments, the second ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The third layer or ply of linerboard can have a basis weight of 10-90 pounds per 1000 sq. ft. In some embodiments the third ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 per 1000 sq. ft.

The laminated end panels or laminated paper stack panel are made of paper layers having extensible kraft paper and/or layers of linerboard. The strength and/or weight of the laminated end panels or laminated paper stack is normally the cumulative value of the individual layers laminated together plus any residual strength or weight added by the glue. For example, a single layer of extensible kraft paper having a basis weight of 100 pounds per 3000 sq. ft. laminated with a single layer of linerboard having a basis weight of 270 pounds per 3000 sq. ft. would yield a laminated end panel or laminated paper stack panel of 370 pounds per 3000 sq. ft.

In some embodiments, the ordering or layering of the individual layers in the laminated end panels or laminated paper stack panels do not matter. For example, if the laminated paper stack panel includes two layers of an extensible kraft paper and one layer of a linerboard, the layering could be the linerboard sandwiched between the two extensible kraft paper layers or the layering could be a layer of extensible kraft paper on top of a layer of extensible kraft paper with the layer of linerboard added last to the top or bottom. In some embodiments, the ordering or layering of the individual layers in the laminated end panels or laminated paper stack panels are not limiting and may be in any order.

In one embodiment, the laminated end panels each include three layers of extensible kraft paper, each layer of extensible kraft paper having a basis weight of 35-150 pounds per 3000 square feet.

In another embodiment, the end panels include a laminated paper stack panel of at least one and up to two layers of extensible kraft paper, each layer of extensible kraft paper having a basis weight of 35-150 pounds per 3000 sq. ft., in combination with a layer of linerboard having a basis weight of 10-90 pounds per 1000 sq. ft.

In another embodiment, the end panels include a laminated paper stack panel of one layer of extensible kraft paper having a basis weight of 35-150 pounds per 3000 sq. ft. in combination with two layers of linerboard, each layer of linerboard having a basis weight of 10-90 pounds per 1000 sq. ft.

In one embodiment, the laminated paper stack panel has a mullen from 100 psi to 800 psi. In another embodiment, the laminated paper stack panel has a mullen from 200 psi to 600 psi. In another embodiment, the laminated paper stack panel has a mullen from 300 psi to 500 psi. In another embodiment, the laminated paper stack panel has a mullen from 250 psi to 400 psi. In another embodiment, the laminated paper stack panel has a mullen of about 300 psi, about 350 psi, about 400 psi, about 450 psi, or about 500 psi.

In one embodiment, the interleaving paper has a mullen from 30 psi to 270 psi. In another embodiment, the interleaving paper has a mullen from 50 psi to 175 psi. In another embodiment, the interleaving paper has a mullen from 70 psi to 100 psi.

Figure 16:
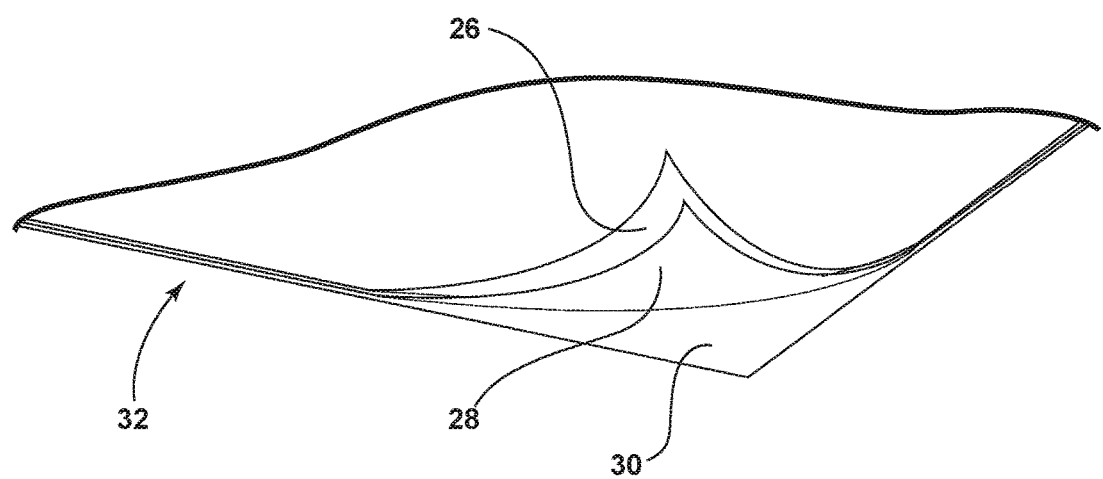
FIG. 16 is a perspective view of an extensible kraft paper laminate.

Referring now to FIG. 16, an extensible kraft paper laminate 32 is shown. The extensible kraft paper laminate 32 shown and described in FIG. 16 is synonymous with the laminated paper stack described above. For example, each of the layering options disclosed above and in FIG. 15, in addition to the properties described for the laminated paper stack should be considered descriptive for the extensible kraft paper laminate 32. The term, "extensible kraft paper laminate 32", as used herein, is defined to mean laminated paper stack as described herein but is used to be more descriptive for a reader. The extensible kraft paper laminate 32 may include a first layer 26, a second layer 28, and a third layer 30. The three layers as shown in FIG. 16 may correspond to any of the respective plys shown and listed in FIG. 15. For example, the three layers 26, 28, 30 may include three plys of extensible kraft paper, two plys of extensible kraft paper and one layer of linerboard, or one ply of extensible kraft paper and two plys of linerboard. The number, arrangement, and thickness of the various layers/plys may be varied depending on the desired application and use as disclosed herein. For the many example embodiments that follow, example laminates having a variety of different layers wherein at least one layer includes an extensible kraft paper are provided and shown. In some embodiments, the extensible kraft paper laminates 32 disclosed herein are each defined to be a full coverage lamination or a partial coverage lamination.

The laminated paper stack panel and/or extensible kraft paper laminate 32 each contain one or more layers of the extensible kraft paper. The advantages of using extensible kraft paper in laminated paper stack panels and/or extensible kraft paper laminates 32 include a reduction in thickness, a reduction in weight, an improvement in racking, an improvement in a nail pull resistance through the laminated paper stack panel and/or the extensible kraft paper laminate 32, an improvement in a nail tear resistance horizontally and/or vertically through the edges of the laminated paper stack panel and/or the extensible kraft paper laminate 32 in addition to improved material properties such as strength measured by mullen, tensile strength (machine direction MID and cross direction CD), and stretching abilities. The ability to have thinner laminated paper stack panels and/or extensible kraft paper laminates 32 with better material properties that also weigh less provides manufacturers, developers, and consumers with the ability to save money on shipping while developing new products that use less raw materials, weigh less, and have better durability.

The extensible kraft paper used to fabricate the laminated paper stack panel and/or extensible kraft paper laminate 32 can be combined with a variety of other paper, non-paper, and/or board layers as described herein and in FIG. 15. For example, other types of paper that can be laminated or coupled with extensible kraft paper include, but are not limited to, chipboard, linerboard, container board, recycled linerboard, gypsum board, fine paper, boxboard (folding or setup, fiberboard, container chip, bending chip, plain chip, manila lined, clay coated news board, solid bleached, unbleached kraft), natural kraft paper, coated or uncoated offset paper or coating base stock, and cardstock. Depending on the type of paper used, the thickness, density, and/or basis weight can each be selected from any value known or used by those skilled in the art. For example, chipboard can be selected based on its thickness and/or density. The thickness of chipboard can range from about 0.001 inches to about 0.070 inches. Any thickness of chipboard to the thousandth of an inch could be used in this range by those making the disclosed laminated paper stack panels and/or extensible kraft paper laminates 32. Additionally, chipboard can be selected based on its density; the density of chipboard is a factor known by those skilled in the art ranging from about 2.1 to about 4.5 (paper density is its mass per unit volume. As defined by ISO 534.2011, paper and board—determination of thickness, density and specific volume, indicates it is expressed in grams per cubic centimeter. The density can be calculated by dividing the grammage of paper by its caliper), where any density of chipboard to a tenth or even hundredth of a unit could be used in this range by those making the disclosed laminated paper stack panels and/or extensible kraft paper laminates 32. Depending on the application and/or product, the laminated paper stack panels and/or extensible kraft paper laminates 32 can include 2, 3, 4, 5, 6, 7, or more layers/plys of paper including at least one layer of extensible kraft paper. In some embodiments, the 2, 3, 4, 5, 6, 7, or more layers/plys of the laminated paper stack panels and/or extensible kraft paper laminates 32 can all be extensible kraft paper. In other embodiments, the 2, 3, 4, 5, 6, 7, or more layers/plys of the laminated paper stack panels and/or extensible kraft paper laminates 32 can include at least two layers of extensible kraft paper and the remaining layers/plys can be any combination of extensible kraft paper and/or non-extensible kraft paper.

In some embodiments, the laminated paper stack panel and/or extensible kraft paper laminates 32 and the embodiments disclosed herein can have a mullen from about 100 psi to about 2000 psi. In other embodiments, the laminated paper stack panel and/or extensible kraft paper laminate 32 can have a mullen from about 200 psi to about 1800 psi. In still other embodiments, the laminated paper stack panel and/or extensible kraft paper laminate 32 can have a mullen from about 300 psi to about 1600 psi. In other embodiments, the laminated paper stack panel and/or extensible kraft paper laminate 32 can have a mullen from about 400 psi to about 1400 psi. In additional embodiments, the laminated paper stack panel and/or extensible kraft paper laminate 32 can have a mullen from about 600 psi to about 1200 psi. In other embodiments, the laminated paper stack panel and/or extensible kraft paper laminate 32 can have a mullen from about 800 psi to about 1000 psi. In some embodiments, the laminated paper stack panel and/or extensible kraft paper laminate 32 can have a mullen of at least 125 psi, at least 200 psi, at least 300 psi, at least 350 psi, at least 400 psi, at least 450 psi, at least 500 psi, at least 550 psi, at least 600 psi, at least 650 psi, at least 700 psi, at least 800 psi, at least 1000 psi, at least 1200 psi, at least 1400 psi, at least 1600 psi, at least 1800 psi, or at least 2000 psi.

In some embodiments, the laminated paper stack panel and/or extensible kraft paper laminates 32 and their use in the embodiments disclosed herein can have a thickness from about 0.005 inches to about 0.500 inches, from about 0.010 inches to about 0.400 inches, from about 0.020 inches to about 0.300 inches, from about 0.030 inches to about 0.250 inches, from about 0.040 inches to about 0.200 inches, from about 0.050 inches to about 0.150 inches, from about 0.060 inches to about 0.100 inches, or from about 0.075 inches to about 0.350 inches. In other embodiments, the laminated paper stack panel and/or extensible kraft paper laminate 32 and the embodiments disclosed herein can have a thickness of about 0.500 inches or less, about 0.450 inches or less, about 0.400 inches or less, about 0.350 inches or less, about 0.300 inches or less, about 0.250 inches or less, about 0.240 inches or less, about 0.200 inches or less, about 0.180 inches or less, about 0.150 inches or less, about 0.120 inches or less, about 0.100 inches or less, about 0.050 inches or less, about 0.040 inches or less, about 0.030 inches or less, or about 0.020 inches or less.

In some embodiments, the laminated paper stack panel and/or the extensible kraft paper laminates 32 and their respective uses in the embodiments disclosed herein can have basis weights (a means of calculating a paper weight shown here as pounds per 1000 square feet), from about 20 pounds per 1000 sq. ft. to less than about 2250 lbs per 1000 sq. ft., from about 30 pounds per 1000 sq. ft. to less than about 2000 pounds per 1000 sq. ft., from about 40 pounds per 1000 sq. ft. to less than about 1800 pounds per 1000 sq. ft., from about 50 pounds per 1000 sq. ft. to less than about 1600 pounds per 1000 sq. ft., from about 60 pounds per 1000 sq. ft. to less than about 1400 pounds per 1000 sq. ft., from about 80 pounds per 1000 sq. ft. to less than about 1300 pounds per 1000 sq. ft., from about 100 pounds per 1000 sq. ft. to less than about 1200 pounds per 1000 sq. ft., from about 200 pounds per 1000 sq. ft. to less than about 1000 pounds per 1000 sq. ft., from about 400 pounds per 1000 sq. ft. to less than about 800 pounds per 1000 sq. ft., from about 500 pounds per 1000 sq. ft. to less than about 600 pounds per 1000 sq. ft., less than about 30 pounds per 1000 sq. ft. to about 20 pounds per 1000 sq. ft., or less than about 2250 pounds per 1000 sq. ft., less than about 2000 pounds per 1000 sq. ft., less than about 1800 pounds per 1000 sq. ft., less than about 1600 pounds per 1000 sq. ft., less than about 1400 pounds per 1000 sq. ft., less than about 1200 pounds per 1000 sq. ft., less than about 1000 pounds per 1000 sq. ft., less than about 800 pounds per 1000 sq. ft., less than about 600 pounds per 1000 sq. ft., less than about 400 pounds per 1000 sq. ft., less than about 200 pounds per 1000 sq. ft., less than about 100 pounds per 1000 sq. ft., less than about 80 pounds per 1000 sq. ft., less than about 60 pounds per 1000 sq. ft., less than about 50 pounds per 1000 sq. ft., or less than about 40 pounds per 1000 sq. ft.

In some embodiments, the extensible kraft paper used to make the laminated paper stack panel and/or the extensible kraft paper laminates 32 can have a basis weight of 20-200 pounds per 3000 sq. ft., 25-200 pounds per 3000 sq. ft., 35-200 pounds per 3000 sq. ft, 35-150 pounds per 3000 sq. ft., 25-150 pounds per 3000 sq. ft. In other embodiments, the extensible kraft paper may have a basis weight of 25-100 pounds per 3000 sq. ft. In other embodiments, the extensible kraft paper may have a basis weight of 25-75 pounds per 3000 sq. ft. In other embodiments, the extensible kraft paper may have a basis weight of about 25 pounds per 3000 sq. ft., about 35 pounds per 3000 sq. ft., about 50 pounds per 3000 sq. ft., about 55 pounds per 3000 sq. ft., about 60 pounds per 3000 sq. ft., about 65 pounds per 3000 sq. ft., about 70 pounds per 3000 sq. ft., or about 75 pounds per 3000 sq. ft. In other embodiments, the non-extensible kraft paper used to make the laminated paper stack panel and/or the extensible kraft paper laminates 32 can have a basis weight of 10-90 pounds per 1000 sq. ft., 10-200 pounds per 1000 sq. ft., 10-500 pounds per 1000 sq. ft., or 10-2250 pounds per 1000 sq. ft.

Figure 17:
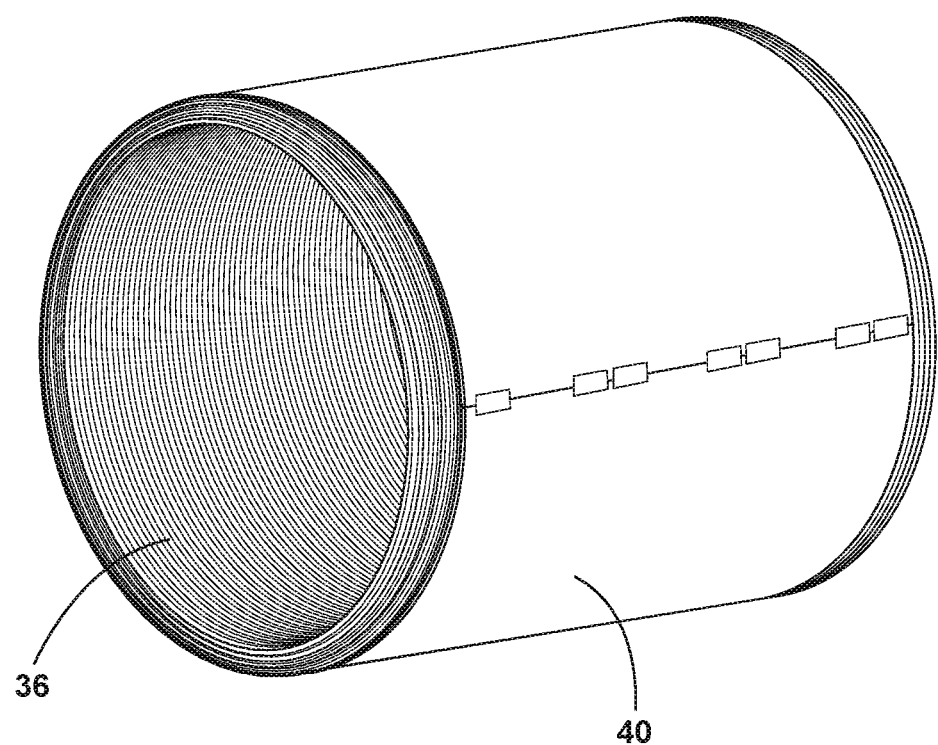
FIG. 17 is a perspective view of a sleeve for wire.

Referring now to FIG. 17, a sleeve 40 is shown wrapped around a coil of wire 36 for packaging and shipment. In some embodiments, the sleeve 40 can be used to wrap around any metal or coiled product. The sleeve 40 used to package the wire 36 can be the laminated paper stack panel and/or the extensible kraft paper laminate 32 and may include, for example, any of the disclosed combinations listed and shown in FIG. 15 plus other combinations depending on the application and embodiments disclosed herein.

Figure 18:
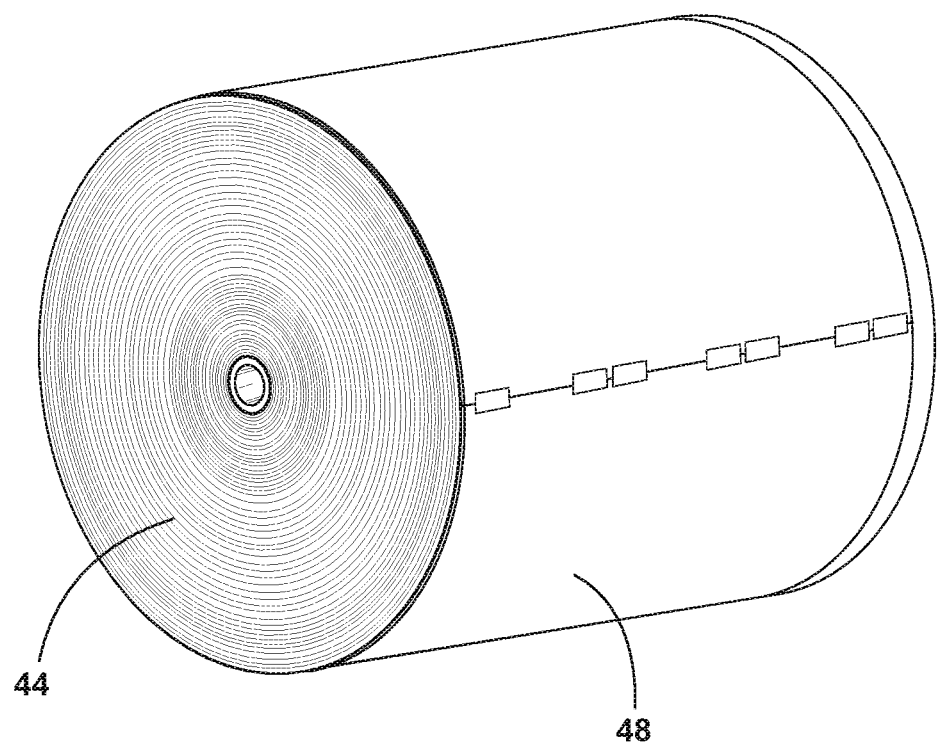
FIG. 18 is a perspective view of a reel wrap.

Referring now to FIG. 18, a wrap 48 is shown wrapped around and covering a roll of paper 44. In some embodiments, the wrap 48 can be used to wrap around any paper or rolled product that needs to be protected during storage or transportation. The wrap 48 used to package the paper 44 can be the laminated paper stack panel and/or extensible kraft paper laminate 32 and may include, for example, any of the disclosed combinations listed and shown in FIG. 15 plus other combinations depending on the application and embodiments disclosed herein.

Referring now to FIGS. 19A-19B, a slip sheet 56 is shown being used in loading applications. In FIG. 19A, for example, the slip sheet 56 is shown positioned between a pallet 60 and a plurality of loading bags 52. Once the loading bags 52 are loaded onto the pallet 60, a user may pull on the slip sheet 56 to pull the load or load bags 52 off of the pallet 60. As shown in FIG. 19B, the slip sheet 56 may have one or more flaps used to pull the slip sheet 56 and the corresponding load 52 off of the pallet 60 or shipping surface. Several different types of slip sheets 56 may be used, for example, FIG. 19B shows the slip sheet 56 may have a single flap 56A, a close-double flap 56B, an adjoining-double flap 56C, and/or a four-flap 56D slip sheet. Other embodiments of 56A, 56B, 56C, and 56D may include clipped corners or edges of the flap to prevent overlap, now shown, but do not depart from the spirit of this device. In some embodiments, the machine direction (MID) tensile strength and/or the cross machine (CD) tensile strength may improve by at least 100%, by at least 80%, by at least 60%, by at least 50%, by at least 40%, by at least 25%, by at least 20%, by at least 10% or by at least 5% as measured by, for example, TAPPI-T494 Tensile Properties of Paper and Paperboard. The slip sheet 56 can be fabricated from the laminated paper stack panel and/or extensible kraft paper laminate 32 and may include, for example, any of the disclosed combinations listed and shown in FIG. 15 plus other combinations depending on the application and embodiments disclosed herein.

Figure 20:
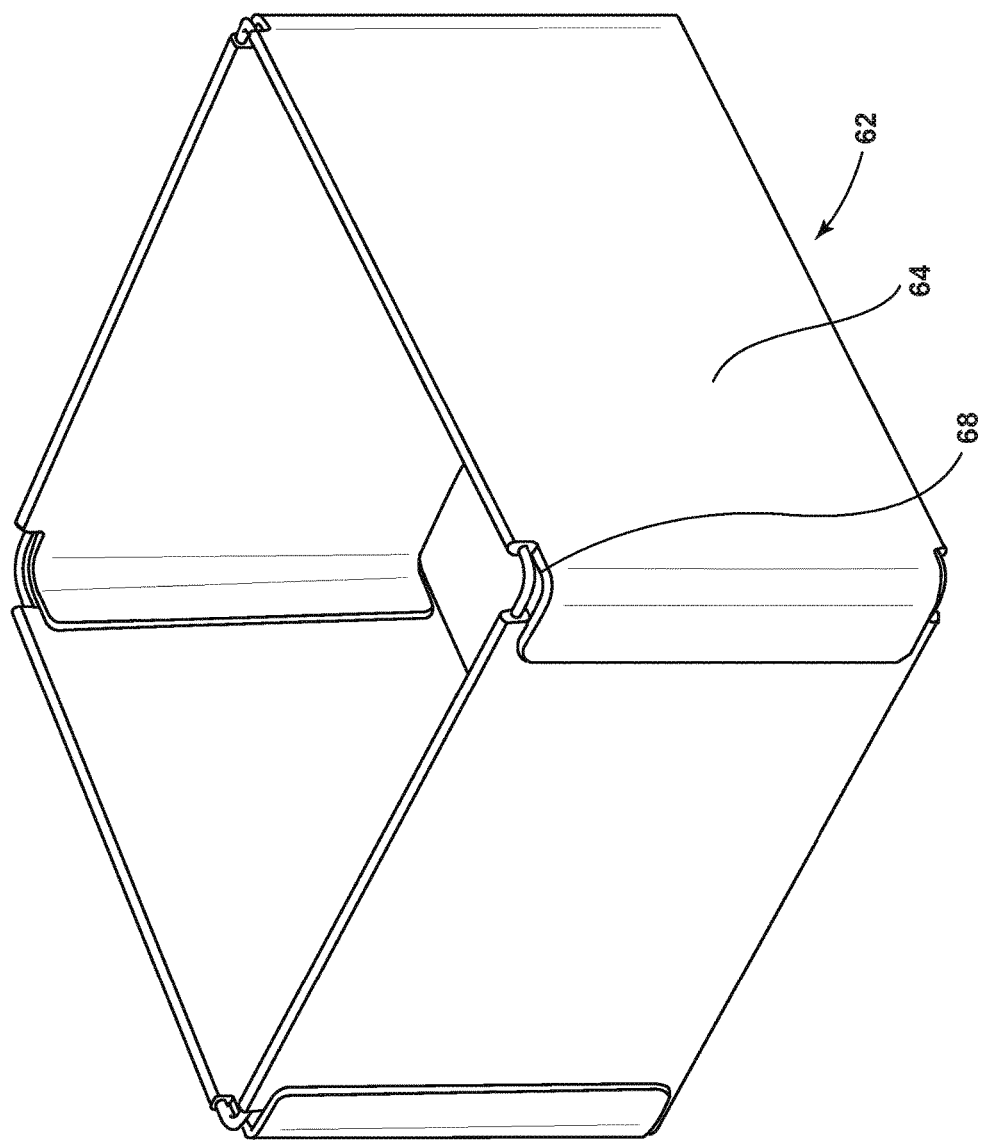
FIG. 20 is a perspective view of a carrying crate.

Referring now to FIG. 20, a carrying crate 62 is shown constructed from a plurality of crate walls 64 and a metal frame/support 68. In some embodiments, the carrying crate 62 may not use a metal frame/support 68 and may be alternately glued, stapled, fastened, or coupled by other known means of paper adhesion known in the art. The carrying crate 62 may be used to load food, cans, mail, or any other number of small units needing to be moved. The crate walls 64 used to enclose the metal frame/support 68 and/or to form the carrying crate 62 can be fabricated from the laminated paper stack panel and/or extensible kraft paper laminate 32 and may include, for example, any of the disclosed combinations listed and shown in FIG. 15 plus other combinations depending on the application and embodiments disclosed herein.

Figure 21:
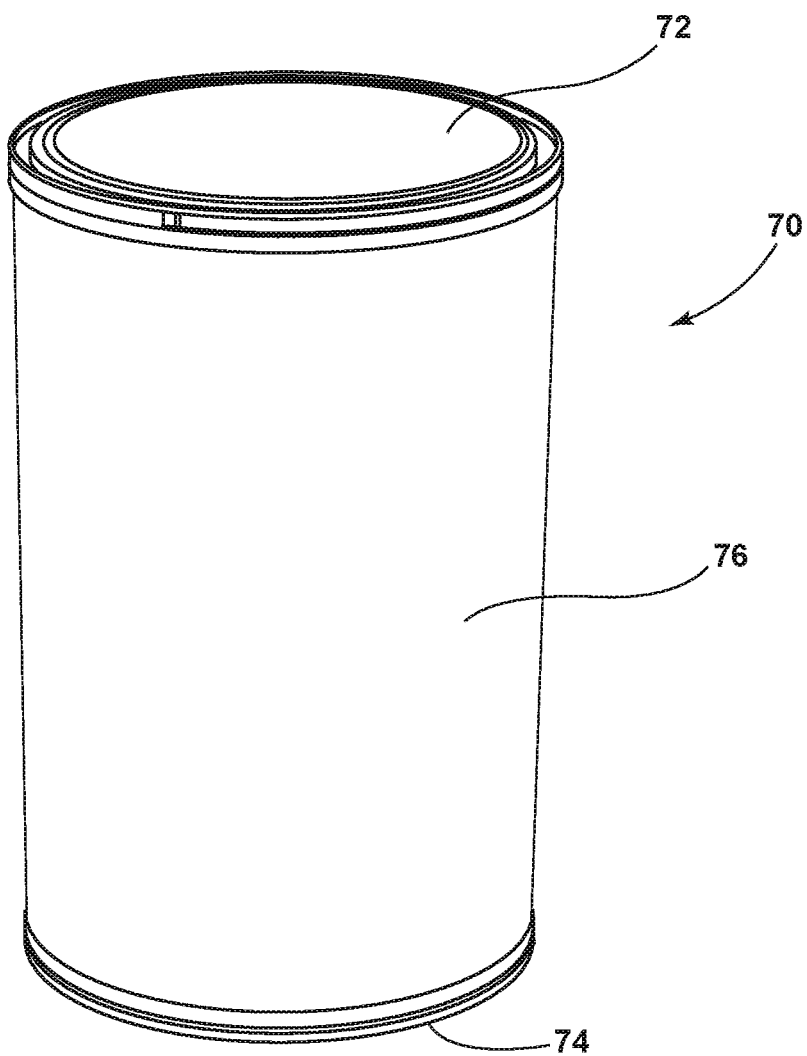
FIG. 21 is a perspective view of a fiber drum.

Referring now to FIG. 21, a fiber drum 70 is shown having a top 72, a bottom 74, and a drum wall 76 used to transport dry or liquid products in bulk. In some embodiments, the top 72, the bottom 74, and the drum wall 76 can be fabricated using the laminated paper stack panel and/or extensible kraft paper laminate 32 and may have a metal locking mechanism to couple the top 72 or bottom 74 in place. In some embodiments, one or more of the components of drum 70 such as the top 72, the bottom 74, and the drum wall 76 can be fabricated using the laminated paper stack panel and/or extensible kraft paper laminate 32 and may include, for example, any of the disclosed combinations listed and shown in FIG. 15 plus other combinations depending on the application and embodiments disclosed herein.

In some embodiments, the fiber drum 70, drum top 72, and drum bottom 74 may have a thickness from about 0.220 inches to about 0.250 inches and a minimum mullen of 1200 psi, a thickness from about 0.200 inches to about 0.220 inches and a minimum mullen of 1100 psi, a thickness of about 0.160 inches to about 0.200 inches and a minimum mullen of 1000 psi, a thickness of about 0.140 inches to about 0.160 inches and a minimum mullen of 1000 psi, a thickness of about 0.120 inches to about 0.140 inches and a minimum mullen of 900 psi, a thickness of about 0.100 inches to about 0.120 inches and a minimum mullen of 800 psi. In other embodiments, the laminated paper stack panel and/or the extensible kraft paper laminate 32 used to form the drum wall 76, drum top 72, and/or drum bottom 74 can have a mullen of at least 1200 psi, at least 1100 psi, at least 1000 psi, at least 900 psi, at least 800 psi, at least 700 psi, or at least 500 psi.

Figure 22A:
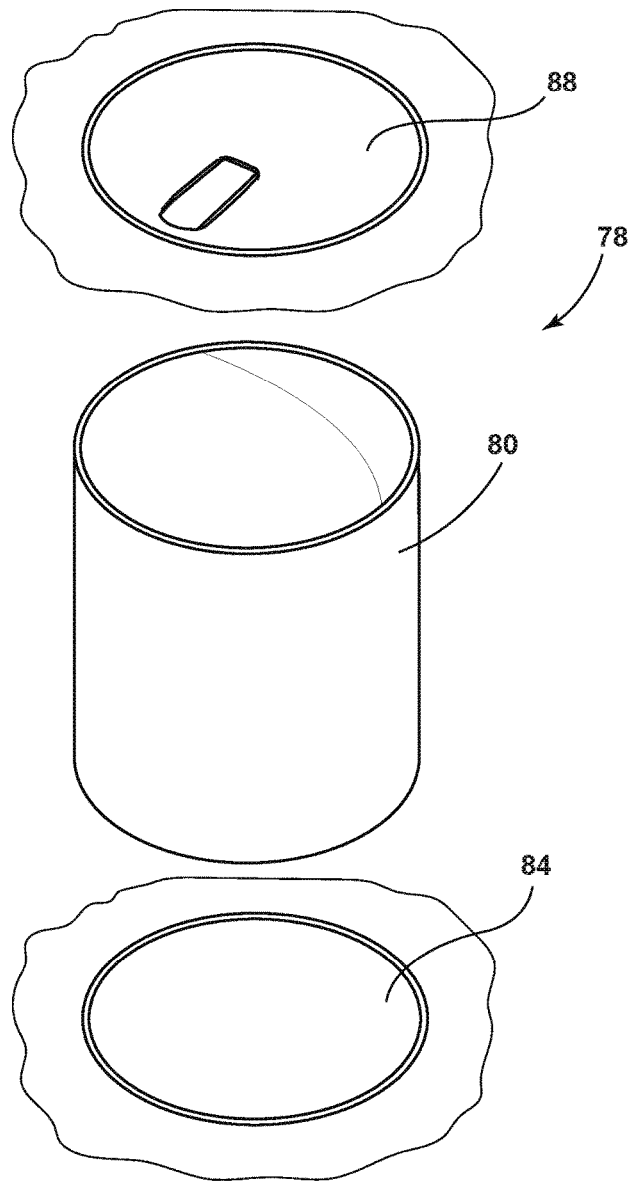
FIG. 22A is a perspective view of a disassembled fiber drum and a fiber top, bottom and wall.
Figure 22B:
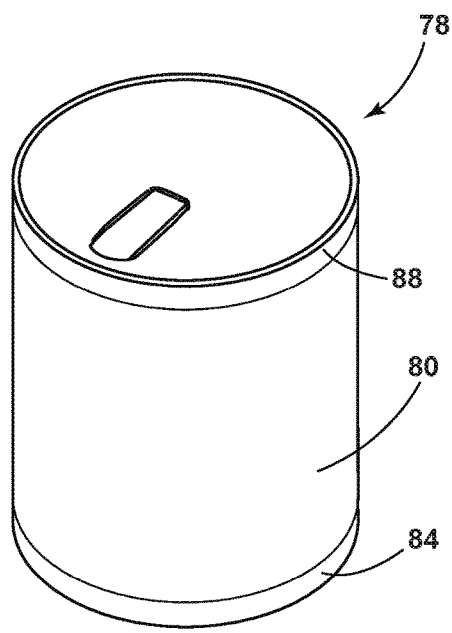
FIG. 22B is a perspective view of a fiber drum.

Referring now to FIG. 22A, another embodiment of a fiber drum 78 is shown having a top portion 88, a bottom portion 84, and a drum wall 80 where the top portion 88 and bottom portion 84 are coupled to the fiber drum wall 80 using a laminated paper stack panel and/or extensible kraft paper laminate 32. FIG. 22B shows the drum 78 assembled with the top portion 88 and bottom portion 84 coupled to the fiber drum wall 80. The fiber drum 78 and/or its various components such as the top portion 88, bottom portion 84, and the fiber drum wall 80 can each be fabricated from the laminated paper stack panel and/or the extensible kraft paper laminates 32 and may include, for example, any of the disclosed combinations listed and shown in FIG. 15 plus other combinations depending on the application and embodiments disclosed herein.

In some embodiments, the fiber drum 70, 78 may include, for example, any product that can be transported in bulk, either dry or liquid, like salt, dry soap, ingredients, glues, pharmaceutical products, chemicals, or food.

Figure 23A:
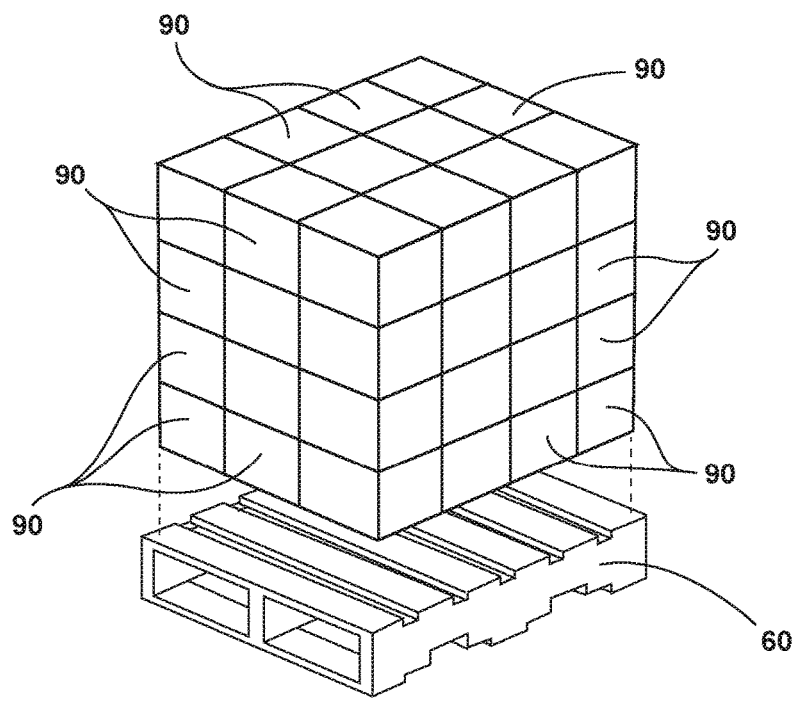
FIG. 23A is a perspective view of a retail carton.

Referring now to FIG. 23A, a retail carton 90 can be tuned to have the desired properties for a given application. For example, FIG. 23A shows that the retail carton 90 can have a stiffness that allows several of the retail cartons 90 to be stacked without damaging the product inside. The retail carton 90 can be fabricated from the laminated paper stack and/or the extensible kraft paper laminate 32 and may include, for example, any of the disclosed combinations listed and shown in FIG. 15 plus other combinations depending on the application and embodiments disclosed herein. In some embodiments, the retail carton 90 may be in the form of a box used to package any number of different materials e.g. cereal, shoes, cosmetics, or bulk food and/or bulk liquids.

Figure 23B:
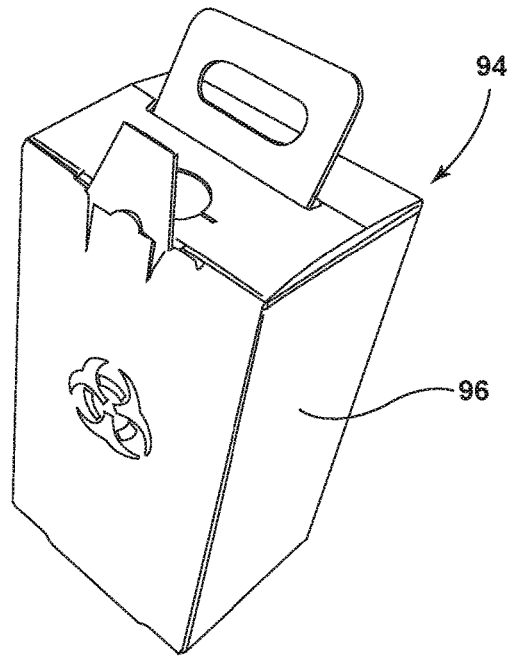
FIG. 23B is a perspective view of a medical carton.

Referring now to FIG. 23B, a medical carton 94 is formed from a medical carton wall 96 folded into a shape resembling the medical carton 94. The medical carton wall 96 can be fabricated from the laminated paper panel stack and/or the extensible kraft paper laminate 32 and may include, for example, any of the disclosed combinations listed and shown in FIG. 15 plus other combinations depending on the application. In some embodiments, the medical carton 94 may be used in the form of a box used to package any number of different materials e.g. medical devices, medical ingredients, or medical supplies.

Figure 24A:
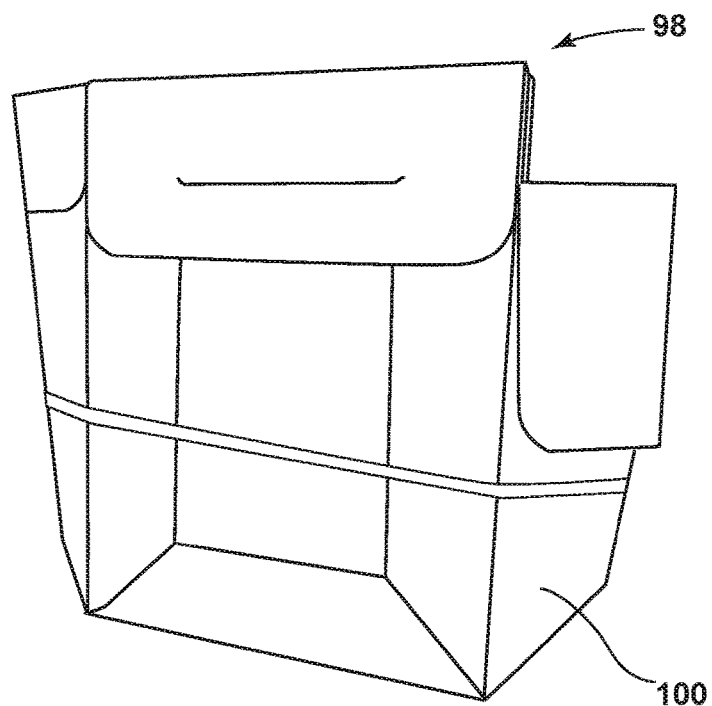
FIG. 24A is a perspective view of a collapsed box for trash.
Figure 24B:
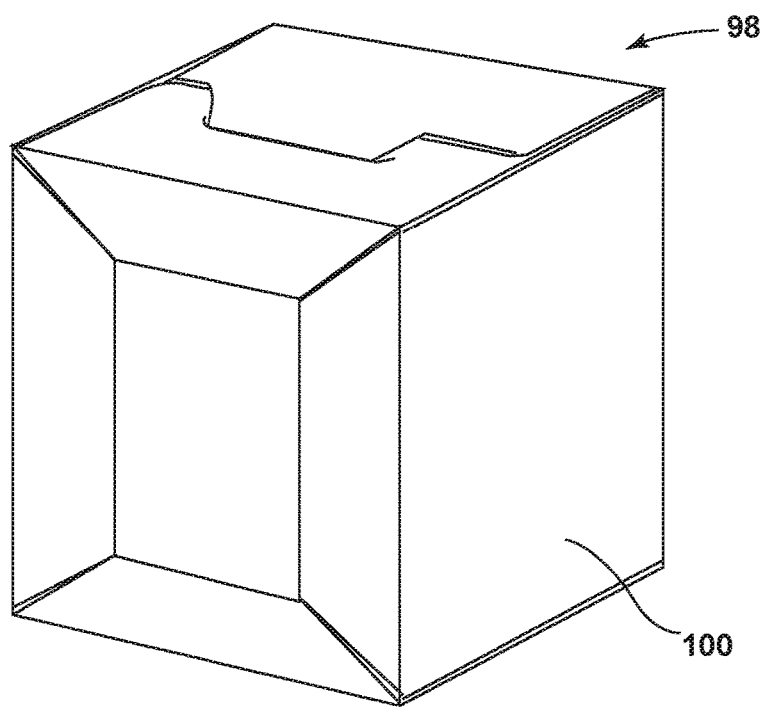
FIG. 24B is a perspective view of an expanded box for trash.

Referring now to FIGS. 24A-24B, a paper box for collecting trash 98 is shown. The paper box for collecting trash 98 is formed from a trash box wall 100. The trash box wall 100 can be fabricated from the laminated paper stack panel and/or the extensible kraft paper laminate 32 and may include, for example, any of the disclosed combinations listed and shown in FIG. 15 plus other combinations depending on the application. FIG. 24A shows the collapsed version and FIG. 24B shows the expanded version of the box for collecting trash 98. In some embodiments, the trash box wall 100 has a thickness of less than 0.050 inches and a mullen of at least 500 psi or at least 600 psi. In other embodiments, the trash box wall 100 has a thickness of less than 0.040 inches and a mullen of at least 500 psi or at least 600 psi.

Figure 25:
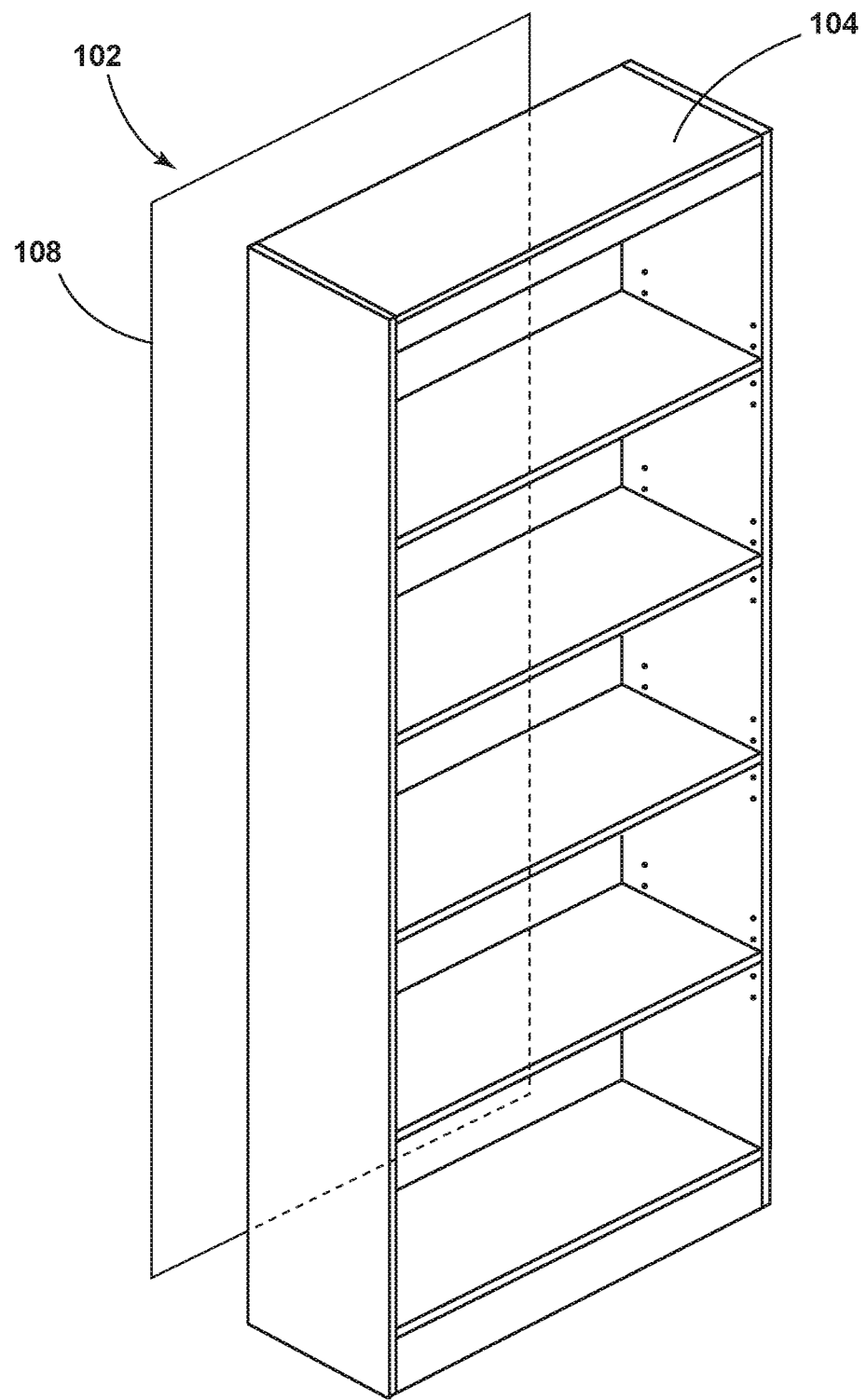
FIG. 25 is a perspective view of a furniture back panel.

Referring now to FIG. 25, a furniture back 102 is shown being made from a furniture back panel 108. The structural integrity of the furniture is directly related to how much force it takes to pull fasteners such as nails or staples either through the panel from front to back and/or vertically or horizontally from the edges. In some embodiments, the nail pull resistance through the panel 108 (laminated paper stack panel and/or extensible kraft paper laminate 32) in any direction can be increased by at least 20%, by at least 15%, by at least 10% or by at least 5% as measured by, for example, ASTM-D 1761-88 Standard Test Methods for Mechanical Fasteners in Wood. In other embodiments, the vertical nail tear resistance and/or horizontal nail tear resistance through the panel 108 (laminated paper stack panel and/or extensible kraft paper laminate 32) in the designated direction can be increased by at least 20%, by at least 15%, by at least 10% or by at least 5% as measured by, for example, ASTM-D 1761-95, ISO 1974, ASTM D689, and/or ASTM D228. The furniture back panel 108 can be fabricated from the laminated paper stack panel and/or the extensible kraft paper laminate 32 and may include, for example, any of the disclosed combinations listed and shown in FIG. 15 plus other combinations depending on the application and embodiments disclosed herein. The furniture back 102 may be used on a piece of furniture 104, for example, a bookcase, desk, dresser, nightstand, etc. to provide structural stability and/or decoration.

Figure 26:
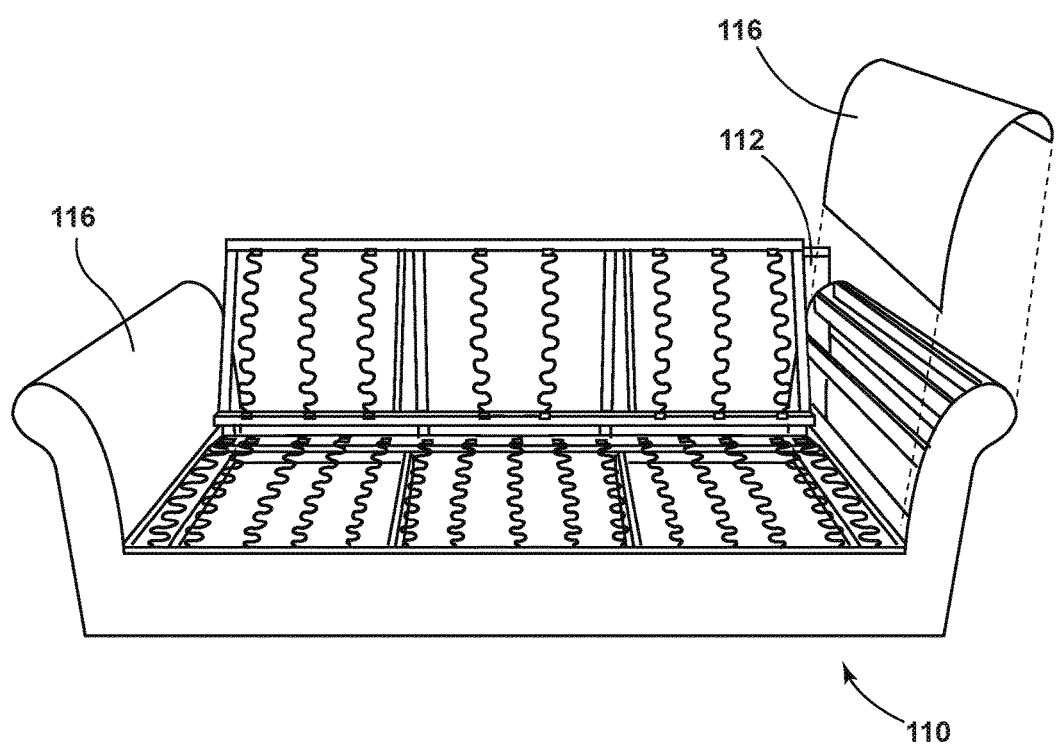
FIG. 26 is a perspective view of a furniture sub-foundation board laminate used on a piece of furniture.

Referring now to FIG. 26, a furniture frame 110 is shown having a frame support 112 to which a sub-foundation board laminate 116 is provided for structural support. Furniture that is shipped pre-assembled is known in the art as case-good furniture and this case-good furniture can utilize the sub-foundation board laminates 116 disclosed herein. The sub-foundation board laminates 116 are coupled to the case-good which includes the furniture frame 112 either by glue, nail, and/or staples. The sub-foundation board laminates 116 are used in a variety of areas to provide support other than the example pictured in FIG. 26. Examples of furniture using the sub-foundation board laminate 116 include, for example, sofas, dressers, couches, upholstered chairs, or any other furniture known in the art. The sub-foundation board laminate 116 can be fabricated from the laminated paper stack panel and/or the extensible kraft paper laminates 32 and may include, for example, any of the disclosed combinations listed and shown in FIG. 15 plus other combinations depending on the application and embodiments disclosed herein.

Figure 27A:
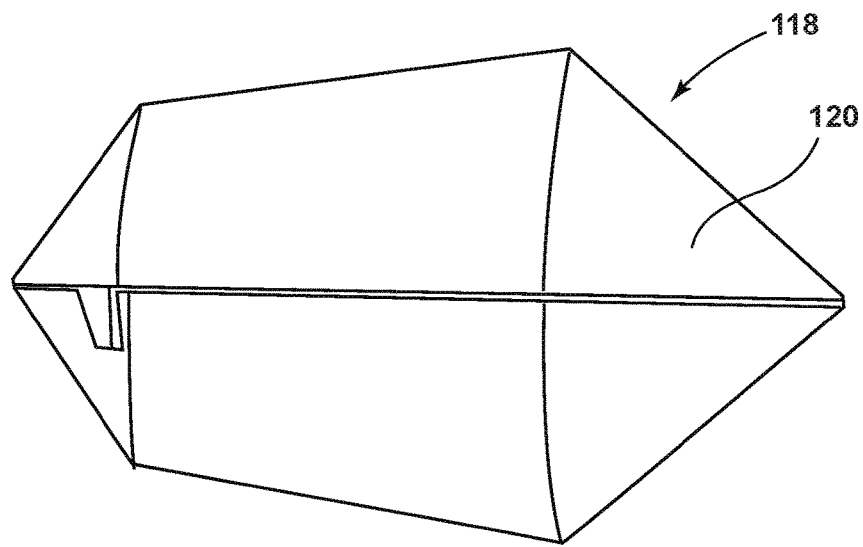
FIG. 27A is a perspective view of a collapsed military packaging box.
Figure 27B:
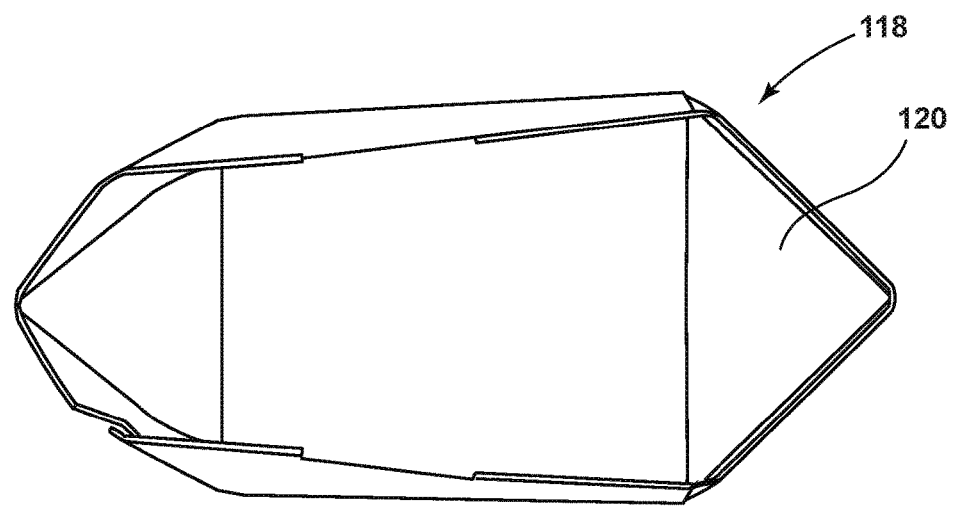
FIG. 27B is a perspective view of an expanded military packaging box.

Referring now to FIGS. 27A-27B, a military packaging box 118 is shown. The military packaging box 118 is fabricated from a box wall 120 that can be folded, overlapped, and/or glued to form the collapsible military packaging box 118. The box wall 120 can be fabricated from the laminated stack panel and/or the extensible kraft paper laminate 32 and may include, for example, any of the disclosed combinations listed and shown in FIG. 15 plus other combinations depending on the application and embodiments disclosed herein. FIG. 27A shows the collapsed state of the military packaging box 118 and FIG. 27B shows the expanded view of the military packaging box 118. In some embodiments, the laminated paper panel and/or the extensible kraft paper laminate 32 may have a weight of about 360 pounds per 1000 sq. ft. and a mullen greater than 600 psi, a weight of about 330 pounds per 1000 sq. ft. and a mullen greater than 500 psi, a weight of about 283 pounds per 1000 sq. ft. and a mullen greater than 350 psi, a weight of about 237 pounds per 1000 sq. ft. and a mullen greater than 275, a weight of about 190 pounds per 1000 sq. ft. and a mullen greater than 200 psi, a weight of about 149 pounds per 1000 sq. ft. and a mullen greater than 174 psi, or a weight of about 114 pounds per 1000 sq. ft. and a mullen greater than 125 psi.

In other embodiments, the laminated paper stack panel and/or the extensible kraft paper laminate 32 used to make the box wall 120 may have a weight less than 250 lb/1000 sq. ft. and a mullen greater than 300 psi, greater than 450 psi, or greater than 600 psi. In still other embodiments, the laminated paper stack panel and/or the extensible kraft paper laminate 32 used to make the box wall 120 may have a weight less than 175 lb/1000 sq. ft. and a mullen greater than 300 psi, greater than 450 psi, or greater than 600 psi. The military packaging box 118 is shown in FIGS. 27A-27B as an example embodiment only, in other embodiments, a V2s, a V3s, a V4s, a W5s, a W6s or any other military box used for food, ammunition or other military supplies may be considered by those skilled in the art to be included under the scope of this invention.

Figure 28:
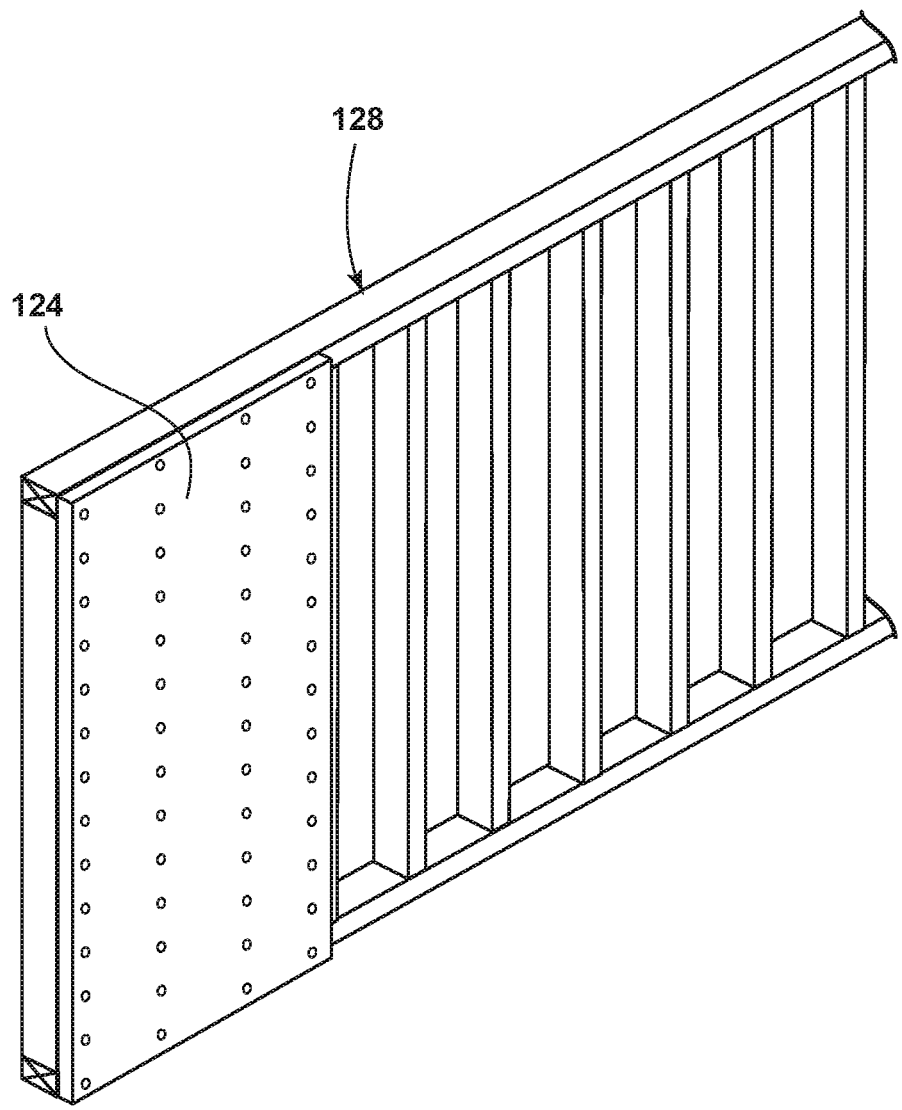
FIG. 28 is a perspective view of a sheathing board used in construction.

Referring now to FIG. 28, a sheathing board 124 can be used in construction applications and can be coupled, for example, to a wall frame 128. In manufactured housing and/or wood framed construction, a sheathing board 124 is used when racking is a parameter to be controlled. Racking is commonly referred to as "allowable racking load" and/or "racking shear value" and is designated in pounds per square feet. In some embodiments, the laminated paper stack panel and/or the extensible kraft paper laminate 32 may have a racking shear value of about 400 pounds per sq. ft. and a thickness of about 0.140 inches, about 200 pounds per sq. ft. and a thickness of about 0.120 inches, about 180 pounds per sq. ft. and a thickness of about 0.105, about 160 pounds per sq. ft. and a thickness of about 0.080 inches, about 180 pounds per sq. ft. and a thickness of about 0.115 inches, about 130 pounds per sq. ft. and a thickness of about 0.105 inches, or about 159 pounds per sq. ft. and a thickness of about 0.078 inches. The sheathing board 124 can be fabricated from the laminated paper stack panel and/or the extensible kraft paper laminate 32 and may include, for example, any of the disclosed combinations listed and shown in FIG. 15 plus other combinations depending on the application. The sheathing board 124 may be used as a construction material, for example, a roof, a wall, a floor, in homes, recreational vehicles or mobile homes etc. to provide structural stability.

The laminated paper stack panel and/or the extensible kraft paper laminate 32 may be used to fabricate or make the sleeve 40, the reel wrap 48, the slip sheet 56, the carrying crate 62, the fiber drum 70, 78, the retail carton 90, the medical carton 94, the box for trash 98, the furniture back 102, the sub-foundation board laminate 116, the sheathing board 124, and the military packaging box 118. The uses of the laminated paper stack panel and/or the extensible kraft paper laminate 32 provided herein are meant to be exemplary and any other additional use or application of the laminated paper stack panels and/or the extensible kraft paper laminates 32 described herein are additionally incorporated herein.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (chemical, electrical or mechanical) directly or indirectly to one another. Such joining may be stationary in nature or movable in nature. Such joining may be achieved with the two components (chemical, electrical or mechanical) and any additional intermediate members being integrally formed as a single unitary body with one another or with the two components. Such joining may be permanent in nature or may be removable or releasable in nature unless otherwise stated. In some embodiments, the laminated paper stack panel and/or the extensible kraft paper laminates 32 may be coupled using a glue, a water soluble glue, a hot melt adhesion, or any other means known in the art to couple paper laminates together.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, thicknesses, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of thicknesses, colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

It should be understood that the foregoing is merely exemplary of the preferred practice of the present invention and that various modifications may be made in the arrangements and details of the construction of the present invention without departing form the spirit and scope of the present invention.

LIST OF NON-LIMITING EMBODIMENTS

Embodiment A is laminated paper stack panel comprising: one or more layers of an extensible kraft paper; and one or more layers of a non-extensible kraft paper; wherein the extensible kraft paper has a basis weight of 25-200 pounds per 3000 sq. ft.

The laminated paper stack panel of Embodiment A wherein the laminated paper stack panel comprises two layers of extensible kraft paper, each layer of extensible kraft paper having a basis weight of 25-200 pounds per 3000 sq. ft.

The laminated paper stack panel of Embodiment A or Embodiment A with any of the intervening features wherein the laminated paper stack panel comprises three layers of extensible kraft paper, each layer of extensible kraft paper having a basis weight of 25-200 pounds per 3000 sq. ft.

The laminated paper stack panel of Embodiment A or Embodiment A with any of the intervening features wherein the laminated paper stack has a mullen of at least 125 psi.

The laminated paper stack panel of Embodiment A or Embodiment A with any of the intervening features for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

The laminated paper stack panel of Embodiment A or Embodiment A with any of the intervening features for its use as a packaging.

The laminated paper stack panel of Embodiment A or Embodiment A with any of the intervening features wherein the laminated paper stack panel comprises two or more layers of extensible kraft paper having a basis weight of 25-200 pounds per 3000 sq. ft. laminated to one or more layers of non-extensible kraft paper, each layer of non-extensible kraft paper having a basis weight of 10-2250 pounds per 1000 sq. ft.

The laminated paper stack panel of Embodiment A or Embodiment A with any of the intervening features wherein the laminated paper stack panel is used as a furniture back panel and/or a sheathing board to give a racking shear value of about 160 pounds per sq. ft.

The laminated paper stack panel of Embodiment A or Embodiment A with any of the intervening features wherein the laminated paper stack panel has an increase in a nail pull resistance, a vertical nail tear resistance, and/or a horizontal nail tear resistance by at least 5% as measured by ASTM-D 1761-88 and/or ASTM-D 1761-95.

The laminated paper stack panel of Embodiment A or Embodiment A with any of the intervening features wherein the laminated paper stack panel has an increase in a machine direction tensile strength and/or a cross machine direction tensile strength by at least 5% as measured by TAPPI-T494.

Embodiment B is an extensible kraft paper laminate comprising: a layer of an extensible kraft paper; and at least one layer of a non-extensible kraft paper or one or more additional layers of the extensible kraft paper; wherein the extensible kraft paper has a basis weight of 25-200 pounds per 3000 sq. ft. and wherein the layers are laminated with a glue.

The extensible kraft paper laminate of Embodiment B wherein the extensible kraft paper laminate has a thickness of 0.500 inches or less.

The extensible kraft paper laminate of Embodiment B or Embodiment B with any of the intervening features wherein the extensible kraft paper laminate has a thickness of 0.240 inches or less.

The extensible kraft paper laminate of Embodiment B or Embodiment B with any of the intervening features wherein the extensible kraft paper laminate has a mullen of at least 125 psi.

The extensible kraft paper laminate of Embodiment B or Embodiment B with any of the intervening features wherein the extensible kraft paper laminate comprises two or more layers of extensible kraft paper, each layer of extensible kraft paper having a basis weight of 25-200 pounds per 3000 sq. ft.

The extensible kraft paper laminate of Embodiment B or Embodiment B with any of the intervening features wherein the extensible kraft paper laminate has a thickness of 0.240 inches or less.

The extensible kraft paper laminate of Embodiment B or Embodiment B with any of the intervening features for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

The extensible kraft paper laminate of Embodiment B or Embodiment B with any of the intervening features wherein the extensible kraft paper laminate is used as a furniture back panel and/or a sheathing board to give a racking shear value of about 160 pounds per sq. ft.

The extensible kraft paper laminate of Embodiment B or Embodiment B with any of the intervening features wherein the extensible kraft paper laminate has an increase in a nail pull resistance, a vertical nail tear resistance, and/or a horizontal nail tear resistance by at least 5% as measured by ASTM-D 1761-88 and/or ASTM-D 1761-95.

The extensible kraft paper laminate of Embodiment B or Embodiment B with any of the intervening features wherein the extensible kraft paper laminate has an increase in a machine direction tensile strength and a cross machine direction tensile strength by at least 5% as measured by TAPPI-T494.

The invention claimed is:

1. A multi-layered laminated paper structure, comprising:
    at least two layers of an extensible kraft paper; wherein the extensible kraft paper has a basis weight of 25-400 pounds per 3000 sq. ft.,
    one or more layers of a non-extensible kraft paper; and
    a layer of adhesive which bonds each of the at least two layers of extensible or non-extensible kraft paper together to form a flexible solid laminated paper structure.

2. The multi-layered laminated paper structure according to claim 1 wherein the laminated paper structure comprises at least five layers of extensible kraft paper, each layer of extensible kraft paper having a basis weight of 25-400 pounds per 3000 sq. ft.

3. The multi-layered laminated paper structure according to claim 2 wherein each of the five layers has a stretch of between about 10-400%.

4. The multi-layered laminated paper structure according to claim 2 wherein the laminated paper structure comprises at least two layers of non-extensible kraft paper.

5. The multi-layered laminated paper structure according to claim 1 wherein the adhesive comprises one of a polymer, polyethylene, polypropylene, polyethylene terephthalate (PET), high density or low density blends of these polymers, solvents, hotmelt, white glue, or waterproof glue.

6. The multi-layered laminated paper structure according to claim 5 wherein the adhesive is applied on an outside surface of the laminated paper structure.

7. The multi-layered laminated paper structure according to claim 1 wherein the laminated paper structure comprises at least one layer of non-extensible kraft paper and six layers of extensible kraft paper, each layer of extensible kraft paper having a basis weight of 25-400 pounds per 3000 sq. ft.

8. The multi-layered laminated paper structure according to claim 1 wherein the laminated paper structure comprises two or more layers of extensible kraft paper having a basis weight of 25-400 pounds per 3000 sq. ft. laminated to one or more layers of non-extensible kraft paper, each layer of non-extensible kraft paper having a basis weight of 10-240 pounds per 1000 sq. ft.

9. The multi-layered laminated paper structure according to claim 1 for its use as an apparatus selected from the group consisting of a stiffener, recreational vehicle sidewall, floor, or roof panel, sleeve, a reel wrap, a slip sheet, a carrying crate, a fiber drum, a retail carton, a food carton, a medical carton, a box for trash, a furniture back, a sheathing board, and a military packaging box.

10. The multi-layered laminated paper structure according to claim 1 wherein the laminated paper structure can be bent around a 1 inch mandrel without fracturing.

11. The multi-layered laminated paper structure according to claim 1 wherein the laminated paper structure can be formed into sheets or rolls.

12. The multi-layered laminated paper structure according to claim 1 wherein the multi-layered laminate paper structure has a thickness of greater than 0.009 inches.

13. A multi-layered laminated paper structure comprising:
three or more layers of extensible kraft paper; wherein each layer of the extensible kraft paper has a basis weight of 25-400 pounds per 3000 sq. ft; and
a layer of adhesive which bonds each of the layers of extensible kraft paper together to form a flexible solid laminated paper structure.

14. The multi-layered laminated paper structure according to claim 13 wherein the laminated paper structure comprises seven layers of extensible kraft paper, each layer of extensible kraft paper having a basis weight of 25-400 pounds per 3000 sq. ft.

15. The multi-layered laminated paper structure according to claim 14 wherein each of the seven layers has a stretch of between about 10-400%.

16. The multi-layered laminated paper structure according to claim 13 wherein the adhesive comprises one of a polymer, polyethylene, polypropylene, polyethylene terephthalate (PET), high density or low density blends of these polymers, solvents, hotmelt, white glue, or waterproof glue.

17. The multi-layered laminated paper structure according to claim 16 wherein the adhesive is applied on an outside surface of the laminated paper structure.

18. The multi-layered laminated paper structure according to claim 13 wherein the laminated paper structure comprises two or more layers of extensible kraft paper having a basis weight of 25-400 pounds per 3000 sq. ft. laminated to one or more layers of non-extensible kraft paper, each layer of non-extensible kraft paper having a basis weight of 10-240 pounds per 1000 sq. ft.

19. The multi-layered laminated paper structure according to claim 13 for its use as an apparatus selected from the group consisting of a stiffener, recreational vehicle sidewall, floor or roof panel, sleeve, a reel wrap, a slip sheet, a carrying crate, a fiber drum, a retail carton, a food carton, a medical carton, a box for trash, a furniture back, a sheathing board, and a military packaging box.

20. The multi-layered laminated paper structure according to claim 13 wherein the laminated paper structure can be bent around a 1 inch mandrel without fracturing.

21. The multi-layered laminated paper structure according to claim 13 wherein the laminated paper structure can be formed into sheets or rolls.

22. The multi-layered laminate paper structure according to claim 13 wherein the multi-layered laminated paper structure has a thickness of greater than 0.009 inches.

* * * * *